United States Patent
Aguirre

(10) Patent No.: US 10,806,283 B2
(45) Date of Patent: Oct. 20, 2020

(54) DISH CADDIES AND DRINK CLEARING TRAYS FOR RESTAURANT TABLE SERVING AND CLEANUP

(71) Applicant: Javier F. Aguirre, Banff (CA)

(72) Inventor: Javier F. Aguirre, Banff (CA)

(*) Notice: Subject to any disclaimer, the term of this patent is extended or adjusted under 35 U.S.C. 154(b) by 0 days.

(21) Appl. No.: 16/457,538

(22) Filed: Jun. 28, 2019

(65) Prior Publication Data

US 2020/0008596 A1 Jan. 9, 2020

(30) Foreign Application Priority Data

Jul. 6, 2018 (CA) ..................... 3010647

(51) Int. Cl.
*A47G 19/08* (2006.01)
*A47G 23/06* (2006.01)
(Continued)

(52) U.S. Cl.
CPC ............ *A47G 19/08* (2013.01); *A47B 96/065* (2013.01); *A47B 96/07* (2013.01); *A47F 5/06* (2013.01);
(Continued)

(58) Field of Classification Search
CPC ........ A47G 19/08; A47G 23/06; A47G 19/02; A47G 19/06; A47G 19/10; B62B 3/02; B62B 3/14; B62B 2301/04; A47F 7/0042; A47F 7/0057; A47F 5/04; A47F 5/06; A47F 5/106; A47F 5/108; A47J 45/10; A47J 47/16; A47B 2031/008; A47B 31/04; A47B 77/14; A47B 81/04; A47B 31/00;
(Continued)

(56) References Cited

U.S. PATENT DOCUMENTS 1,167,934 A * 1/1916 Roth ..................... A47G 19/08
294/143
1,430,748 A * 10/1922 Nolte ..................... A47J 47/16
211/78
(Continued)

OTHER PUBLICATIONS

Jackstack, "Jackstack Plate Trolleys 21x21 cm new spread LR", downloaded from www.jackstack.com/en/us/downloads/, downloaded on May 23, 2018, 7 pages.
(Continued)

*Primary Examiner* — Jennifer E. Novosad
(74) *Attorney, Agent, or Firm* — ATMAC Patent Services Ltd.; Andrew T. MacMillan

(57) ABSTRACT

A dish caddy includes base and top members and a least one vertical supporting rod connecting the base to the top member. The supporting rod includes a hand grip and dish holders distributed at multiple levels along the supporting rod such that a user's hand does not interfere with dishes or food carried within the dish caddy. The dish holders may include notches carved into the supporting rod for accepting an edge of a dish such as a plate. Pivot arms and doors may hold the dishes within the notches during food transport. The dish holders may include top and bottom pressure pads and the distance between the pads on each individual dish holder may be user-adjustable to accommodate different sized dishes. The top and bottom pressure pads may be coupled by a gear system allowing the distance between the pads on a particular dish holder to be dynamically adjusted.

20 Claims, 31 Drawing Sheets

(51) Int. Cl.
*A47F 5/06* (2006.01)
*A47B 96/06* (2006.01)
*A47B 96/07* (2006.01)
*A47F 7/00* (2006.01)
*A47B 31/00* (2006.01)
*A47F 5/10* (2006.01)
*B62B 3/02* (2006.01)
*B62B 3/14* (2006.01)
*B32B 3/14* (2006.01)

(52) U.S. Cl.
CPC .......... *A47F 5/106* (2013.01); *A47F 7/0057* (2013.01); *A47G 23/06* (2013.01); *B62B 3/02* (2013.01); *B62B 3/14* (2013.01); *A47B 2031/007* (2013.01); *B62B 2301/04* (2013.01)

(58) Field of Classification Search
CPC .......... A47B 31/001; A47B 2031/002; A47B 2031/003; A47B 2031/004; A47B 2031/005; A47B 2031/007; A47B 96/06; A47B 96/063; A47B 96/065; A47B 57/56; A47B 57/54; A47B 96/07; A47B 96/14; A47B 96/1466; A47B 57/425; A47B 45/00
USPC .......... 211/196, 205, 41.11, 41.2, 41.7, 197, 211/107, 207, 208, 209, 175, 1.57; 248/539, 541, 250, 245, 246, 281.4, 248/297.21, 295.11, 316.3, 316.4, 316.6, 248/316.2, 159, 158, 176.1, 187.1, 219.4, 248/219.3, 219.1
See application file for complete search history.

(56) References Cited

U.S. PATENT DOCUMENTS

| | | | | |
|---|---|---|---|---|
| 1,904,725 A * | 4/1933 | Gerhold | A47G 19/08 | 211/41.2 |
| 2,916,180 A * | 12/1959 | Alger | A47G 19/08 | 220/23.86 |
| 3,124,402 A * | 3/1964 | Rhoads | A47B 88/483 | 312/350 |
| 3,140,507 A * | 7/1964 | Rozmus | A47G 19/08 | 16/221 |
| 3,533,590 A * | 10/1970 | Swire | A47G 23/0225 | 248/311.2 |
| 4,192,424 A * | 3/1980 | Allsop | A47B 57/567 | 211/37 |
| 4,589,556 A * | 5/1986 | Peretz | A47L 15/505 | 211/41.2 |
| 4,666,117 A * | 5/1987 | Taft | A47B 96/063 | 108/108 |
| 4,738,426 A * | 4/1988 | Bessinger | A47K 1/08 | 108/152 |
| 4,911,308 A * | 3/1990 | Nylund | A47F 5/04 | 211/41.2 |
| 5,064,236 A * | 11/1991 | Stanfield | A47J 47/16 | 211/49.1 |
| 5,067,619 A * | 11/1991 | Wu | A47L 19/04 | 108/24 |
| 5,121,842 A * | 6/1992 | Osborne | A47F 7/06 | 211/30 |
| 5,129,525 A * | 7/1992 | Maynard, Jr. | A47B 19/04 | 211/133.1 |
| 5,207,334 A * | 5/1993 | Lear | A47J 47/16 | 211/184 |
| 5,246,195 A * | 9/1993 | Huff | A47J 47/16 | 248/309.1 |
| 5,330,060 A * | 7/1994 | Bohner | A47B 31/00 | 211/41.4 |
| 5,456,435 A * | 10/1995 | Sweeney | A47B 57/40 | 211/90.01 |
| 5,538,145 A * | 7/1996 | Held | A47B 31/00 | 211/41.2 |
| D401,084 S * | 11/1998 | Martin | D6/675.3 | |
| 5,836,458 A * | 11/1998 | Nales | A47F 7/0064 | 211/41.2 |
| 5,908,121 A * | 6/1999 | Dardashti | A47B 57/34 | 211/188 |
| 6,105,794 A * | 8/2000 | Bauer | A47B 57/26 | 108/108 |
| 6,203,035 B1 * | 3/2001 | Ondrasik | B62B 3/006 | 211/126.1 |
| 6,302,280 B1 * | 10/2001 | Bermes | B60R 9/00 | 211/175 |
| 6,409,029 B1 * | 6/2002 | Bermes | A01D 75/004 | 211/207 |
| 6,726,033 B2 * | 4/2004 | Sparkowski | A47F 13/085 | 211/196 |
| 6,827,320 B2 * | 12/2004 | Yeh | A47B 57/565 | 248/220.22 |
| 7,293,667 B2 * | 11/2007 | Flynn | A47B 57/565 | 211/187 |
| 7,975,867 B1 | 7/2011 | Turner | | |
| 8,152,258 B2 * | 4/2012 | Kang | F25D 25/04 | 108/108 |
| 8,720,708 B1 * | 5/2014 | Gilmore | A47G 7/041 | 108/92 |
| 9,723,936 B2 * | 8/2017 | Nales | A47G 19/08 | |
| 2003/0000905 A1 * | 1/2003 | Zidek | A47F 5/01 | 211/205 |
| 2004/0051015 A1 * | 3/2004 | Ohrling | A47B 96/065 | 248/214 |
| 2004/0232297 A1 * | 11/2004 | Migli | A47B 96/065 | 248/250 |
| 2006/0049323 A1 * | 3/2006 | Anzai | A47B 96/065 | 248/250 |
| 2007/0132260 A1 * | 6/2007 | Lord | A47G 19/08 | 294/161 |
| 2008/0210651 A1 * | 9/2008 | Chen | A47B 57/56 | 211/207 |
| 2009/0001039 A1 * | 1/2009 | Lin | A47B 57/26 | 211/208 |
| 2009/0195005 A1 * | 8/2009 | Lord | A45F 5/00 | 294/161 |
| 2010/0181442 A1 * | 7/2010 | Nales | A47F 5/04 | 248/121 |
| 2011/0220599 A1 * | 9/2011 | Siahpush | A47G 23/0616 | 211/85.4 |
| 2012/0257346 A1 * | 10/2012 | Hulet | G06F 1/166 | 361/679.32 |
| 2020/0008596 A1 * | 1/2020 | Aguirre | A47G 19/08 | |

OTHER PUBLICATIONS

Plate Mate, "PM 48 Collapsible—code 155", downloaded from https://www.plate-mate.com/wp-content/uploads/2016/08/48_Plate_Collapsible_Spec_Sheet.pdf, downloaded on May 22, 2018, copyright 1996, 2 pages.

Plate Mate, "TM 12 Table Model—code 230", downloaded from https://www.plate-mate.com/wp-content/uploads/2016/08/12_Plate_Table_Top_Spec_Sheet.pdf, downloaded on May 22, 2018, copyright 1996, 2 pages.

Plate Mate, "TM 36 Table Model—code 210", downloaded from https://www.plate-mate.com/wp-content/uploads/2016/08/36_Plate_Table_Top_Spec_Sheet.pdf, downloaded on May 22, 2018, copyright 1996, 2 pages.

* cited by examiner

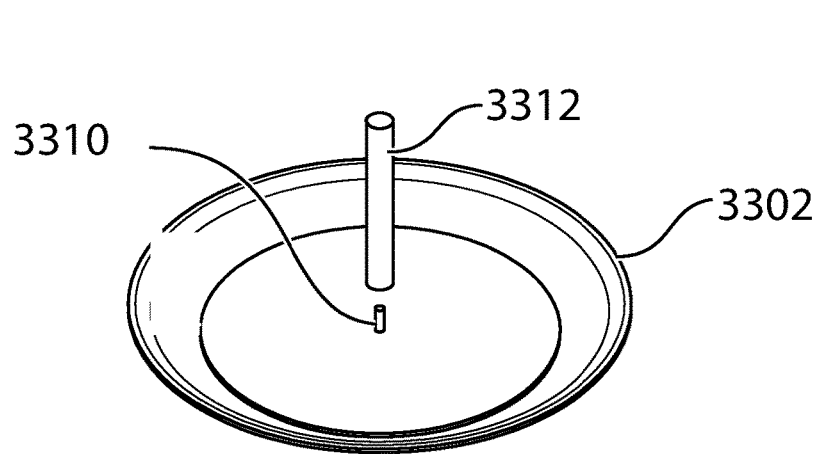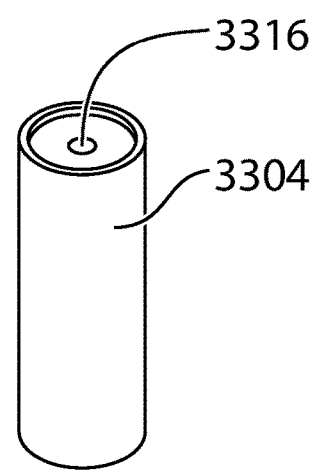
FIG. 34  FIG. 35
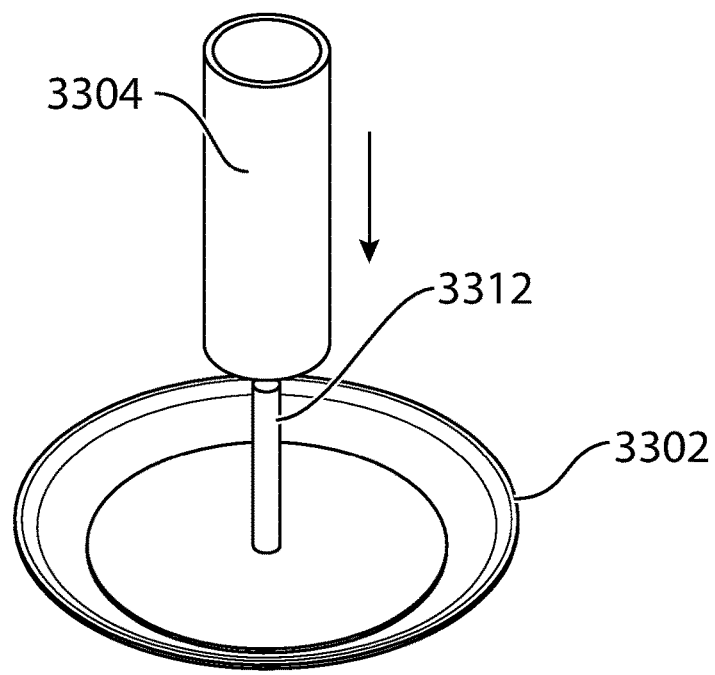
FIG. 36

DISH CADDIES AND DRINK CLEARING TRAYS FOR RESTAURANT TABLE SERVING AND CLEANUP

CROSS-REFERENCE TO RELATED APPLICATIONS

This application claims the benefit of priority of Canadian Application No. 3,010,647 filed Jul. 6, 2018, which is incorporated herein by reference.

BACKGROUND OF THE INVENTION

(1) Field of the Invention

The invention pertains generally to transporting ready-to-eat meals to tables within a restaurant and subsequent table clearing. More specifically, the invention relates to dish caddies and drink clearing trays for restaurant table serving and cleanup.

(2) Description of the Related Art

A problem in the restaurant industry is the inability of "food runners" or expos" to deliver more than two to three dishes at a time to any given table. Staff members who perform these tasks are often inexperienced and receive minimum wage. Requiring a single employee to make frequent trips to serve a large table is an ineffective use of the employee especially considering minimum wage is skyrocketing in North American markets. Furthermore, having an employee run back and forth between the kitchen and a particular table leaves patrons of medium to large groups (6+) waiting several minutes for the full table to receive their appetizers/meals/deserts. Taking a long time to fully serve a table detracts from the dining experience as many people will not start eating until all members of the party have been served. Likewise, the first person served of a group may well be halfway done by the time the last person of the group receives his or her meal.

There are large oval trays capable of carrying five to six small plates or up to four large dishes. So-called "torpedo trays" carry six to seven small salad plates or four full meal plates and are usually carried in one hand with a foldable stand carried in the other hand. However, these large trays are unstable when carried in a single hand and require time to learn and practice proper technique before an employee is comfortable and proficient with their use. They must be carried over the shoulder when loaded with weight and cause the server to have an unergonomic/unnatural body stance. Because of their size, only one such tray can be carried by any single employee at the time. For serving a table that requires more food than can fit on a single tray, most restaurants gather three to four servers at one time to follow each other out with up to three plates each when a large group's food is ready. Requiring multiple servers for a single table prevents offering service to other patrons while the large group is being served. Large group reservations are often dealt with by scheduling more expo/food runners with the knowledge that it is physically impossible for just one person to deal with delivery of many dishes to a big group.

The use of large trays unfortunately often results in inexperienced staff members losing their balance and dropping all the dishes. The restaurant then needs to immediately replace the lost food and multiple employees need to take time to clean up the mess.

Trollies are an available option to avoid the problems of large serving trays; however, trollies suffer from other problems such as being bulky and aesthetically unpleasing. Likewise, the size and weight of trollies make it difficult or even impossible for the server to bring food up stairs or over obstacles on the floor. For these reasons, trollies are usually only used to clear tables once the diners have left.

BRIEF SUMMARY OF THE INVENTION

It is an object of some embodiments disclosed herein to provide a dish caddy supporting dish transport and delivery of between four to sixteen plates by a single staff member of a restaurant from the kitchen to any given table.

According to an exemplary embodiment of the invention there is disclosed a dish caddy including base and top members and a least one vertical supporting rod connecting the base to the top member. The supporting rod includes a hand grip and dish holders distributed at multiple levels along the supporting rod such that a user's hand does not interfere with dishes or food carried within the dish caddy. The dish holders may include notches carved into the supporting rod for accepting an edge of a dish such as a plate or bowl. Pivot arms and doors may hold the dishes within the notches during food transport. The dish holders may include top and bottom pressure pads and the distance between the pads on each individual dish holder may be user-adjustable to accommodate different sized dishes. The top and bottom pressure pads may be coupled by a gear system allowing the distance between the pads on a particular dish holder to be dynamically adjusted.

Exemplary embodiments of the invention address the number of plates and other dishes that may be safely carried by a single employee at one time. Dish caddies disclosed herein may beneficially help eliminate losses and issues caused by the lack of stability offered by existing serving trays utilized at most restaurants. Furthermore, dish caddies disclosed herein may reduce the need of multiple staff members to deal with large groups and/or large customer volumes during peak business hours, therefore reducing payroll expenditures.

These and other advantages and embodiments of the present invention will no doubt become apparent to those of ordinary skill in the art after reading the following detailed description of preferred embodiments illustrated in the various figures and drawings.

BRIEF DESCRIPTION OF THE DRAWINGS

The invention will be described in greater detail with reference to the accompanying drawings which represent preferred embodiments thereof:

FIG. 34 illustrates a perspective view of a second step in a process of converting a regular serving tray into a drink clearing tray according to an exemplary embodiment.

FIG. 35 illustrates a bottom view of the cylinder showing that the cylinder is sealed on the bottom and includes a post mounting cavity for accepting the cylinder securing post.

FIG. 36 illustrates a perspective view of a third step in a process of converting a regular serving tray into a drink clearing tray according to an exemplary embodiment.

DETAILED DESCRIPTION

Figure 1:
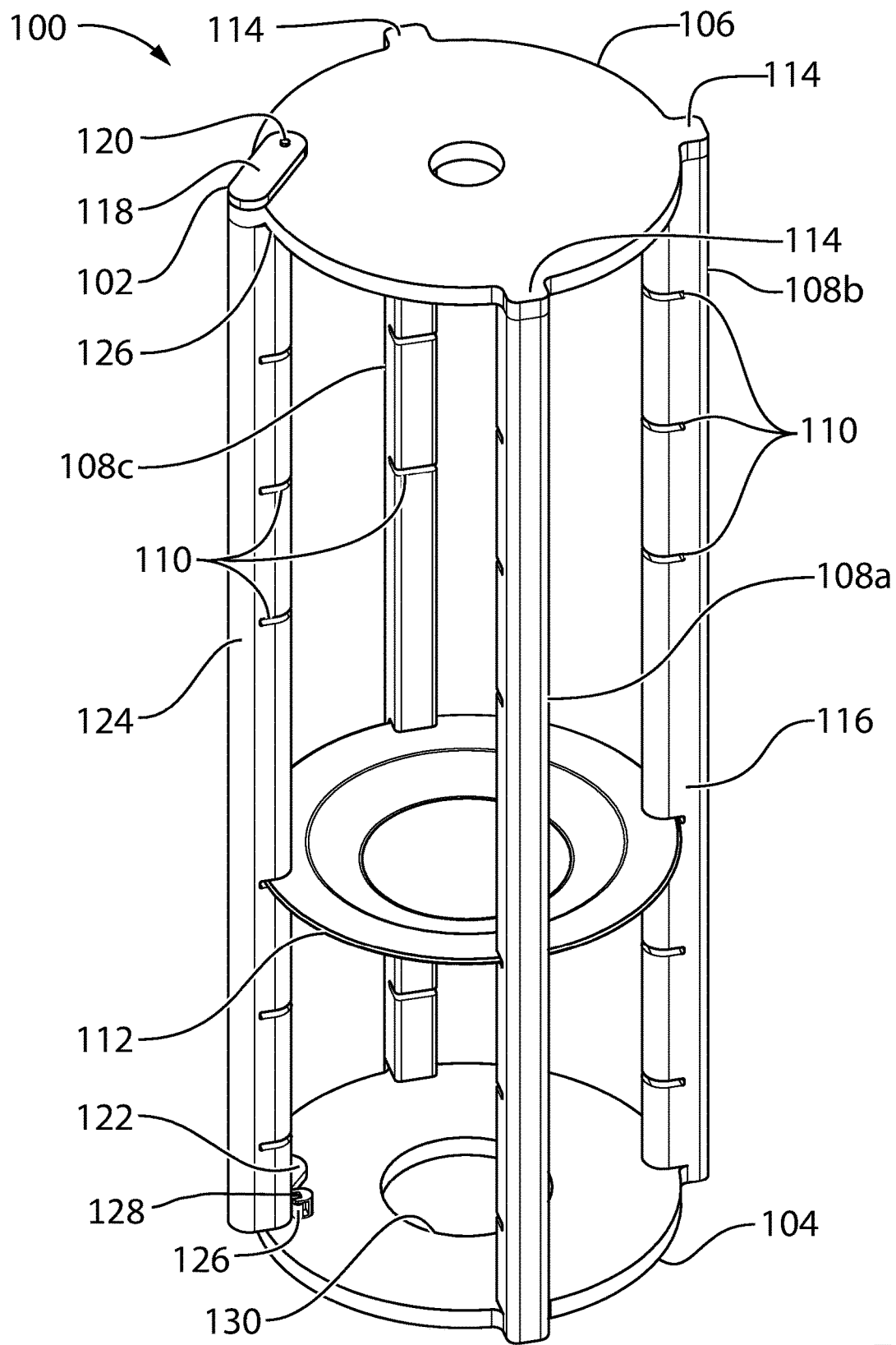
FIG. 1 illustrates a perspective view of a six-plate dish caddy shown with a pivot arm in a closed position according to an exemplary embodiment.

FIG. 1 illustrates a perspective view of a six-plate dish caddy 100 shown with a pivot arm 102 in a closed position according to an exemplary embodiment. The dish caddy 100 includes a base member 104 and a top member 106 separated by three supporting rods 108 and a pivot arm. The supporting rods 108 and pivot arm 102 include inward-facing notches 110 acting as dish holders at staggered heights for accepting the edge of a respective plate 112 that may be inserted therein. In the example shown, the dish caddy 100 includes six levels of notches 110 and can therefore hold a plurality of six plates 112.

The base and top members 104, 106 are circular and the supporting rods 108 are distributed with substantially equal separation spacing on one side of the circular base and top 104, 106. For instance, taking the three-hundred and sixty degrees around the circular base/top 104, 106, a first supporting rod 108a is positioned at zero degrees, a second, center supporting rod 108b is at ninety degrees, and a third supporting rod 108c is at one-hundred and eighty degrees. The supporting rods 108 are mounted on tabs 114 extending outward on the perimeter of the base and top 104, 106.

The center supporting rod 108b further includes a hand grip area 116 for a user to carry the dish caddy 100. Higher friction gripping material such as rubber and/or or foam may be provided on the hand grip area 116 to facilitate holding by a user. In this embodiment, there are no notches 110 on any of the supporting rods 108 at the vertical height matching the hand grip 116. Therefore, even when fully loaded with plates 112, the user's hand and fingers can wrap around the second supporting rod 108b (and/or other supporting rods 108) at the hand grip 116 without interfering with any plate 112 or food carried on a plate 112 within the dish caddy 100.

Taking some conservative estimates, a typical empty plate 112 may be 1.25 lbs, food on the plate 112 may be up to 0.75 lbs, and the weight of the dish caddy 100 itself may be 2.5 lbs. Thus, with six fully loaded plates 112, the total weight of the dish caddy 100 may be approximately 14.5 lbs, which can be easily carried by typical person in a single hand. However, hand grip areas 116 and possible high friction pads or hand grip wrappers may also be provided on the first and third supporting arms 108a, 108b in other embodiments and the user may choose to hold the dish caddy 100 with two hands if so desired. Likewise, a user may carry the dish caddy 100 with one hand holding the hand grip area 116 and another hand placed under the base member 104 for extra support.

The pivot arm 102 has an upper horizontal portion 118 connected at a pivot point 120 on the top, and a lower horizontal portion 122 connected at a pivot point 120 on the base 104. The upper and lower horizontal portions 118, 122 of the pivot arm 102 are connected to one another by a vertical locking arm 124. The pivot points 120 are located on the side of the base/top 106, 108 opposite the supporting rods 108, but they are not centered with equal spacing between the first and third supporting rods 108a, 108c. Instead, continuing the above example degree positions, the pivot points 120 in this embodiment are offset closer to the third supporting rod 108c and located at approximately two-hundred and twenty-five degrees.

A pair of spring biased roller latches 126 are mounted on the top and on the base 104, 108 near the position where the locking arm 124 makes contact with the top and base members 104, 108. The locking arm 124 further has upper and lower tabs 128 mounted near the positions where the locking arm 124 makes contact with the top and base 104, 106. When the pivot arm 102 is rotated in the closed position as illustrated in FIG. 1, each tab 128 is inserted between a pair of roller latches 126 and the roller latches 126 hold the tabs 128 therein by the force of the spring. The pivot arm 102 is thereby securely held in the closed position. The inward-facing notches 110 on the pivot arm 102 and the supporting rods 108 at each respective level can hold a plate 112 captive within the dish caddy 100. While the pivot arm 102 remains locked in the closed position, it is not possible to remove the plate 112. To insert or remove a plate 112 from the dish caddy 100, a user must overcome the friction and spring forces of the roller latches 126 and remove the tabs 128 from the roller latches 126. Once this is done, the user can move the locking arm 124 of the pivot arm 102 toward the third supporting rod 108c at one-hundred and eighty degrees and thereby create enough space to remove the plates 112 from the dish caddy 100.

Figure 2:
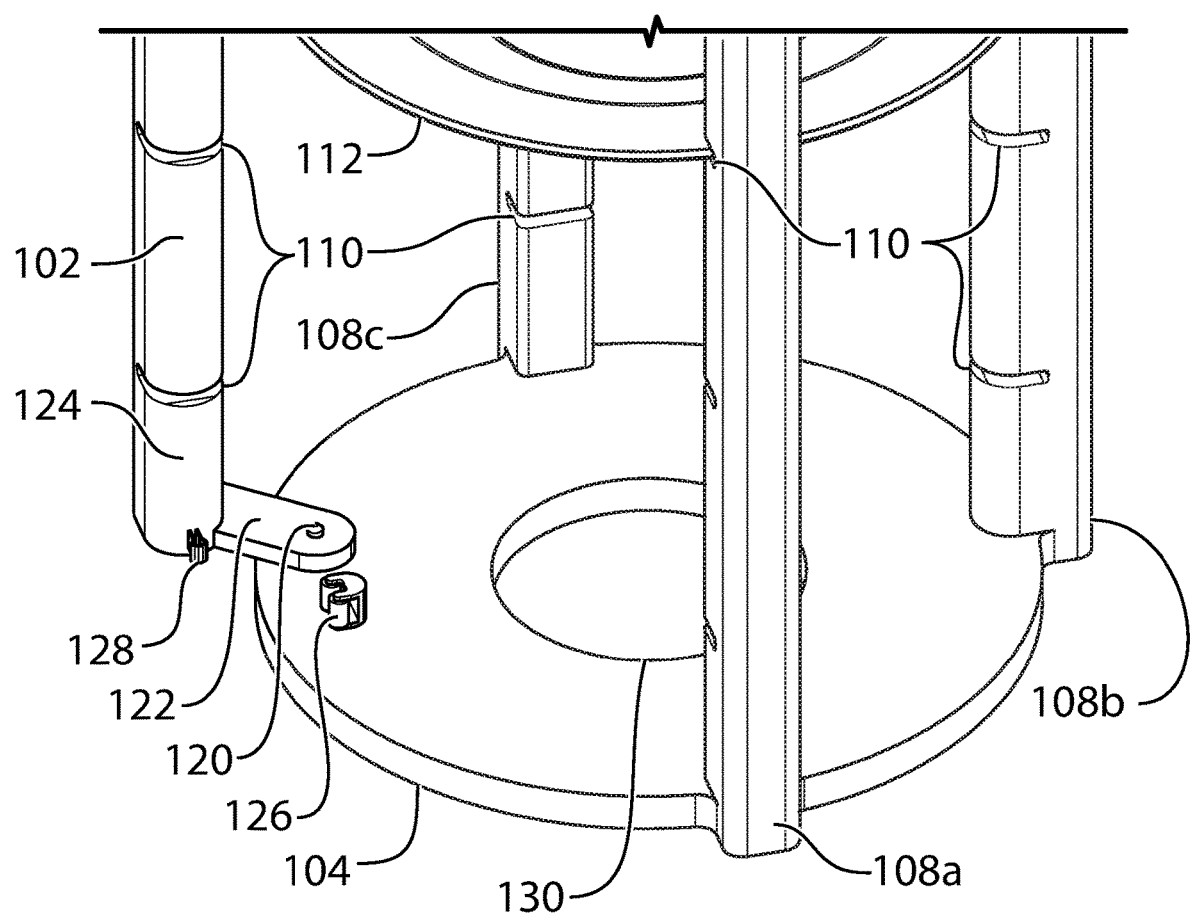
FIG. 2 illustrates a perspective view of the dish caddy of FIG. 1 with the pivot arm in an open position.

FIG. 2 illustrates a perspective view of the dish caddy of FIG. 1 with the pivot arm 102 in an open position. As illustrated, the tab 128 has now been removed from the roller latches 126 and the locking arm 124 has been moved toward the third support rod 108c. By rotating the pivot arm 102 in this manner, the notch 110 on the inner-facing side of the locking arm 124 is no longer holding the edge of the plate 112. Assuming the dish caddy 100 itself is being held level by the user or is resting with its base 104 on a level surface such as a table, the plate 112 is still supported by the notches 110 on the three supporting rods 108 and the plate 112 is therefore stable and will not fall even though the locking arm 124 is no longer engaging the plate 112 edge. With the pivot arm 102 rotated in the open position, the user can easily remove the plate 112 from the dish caddy 100.

Figure 3:
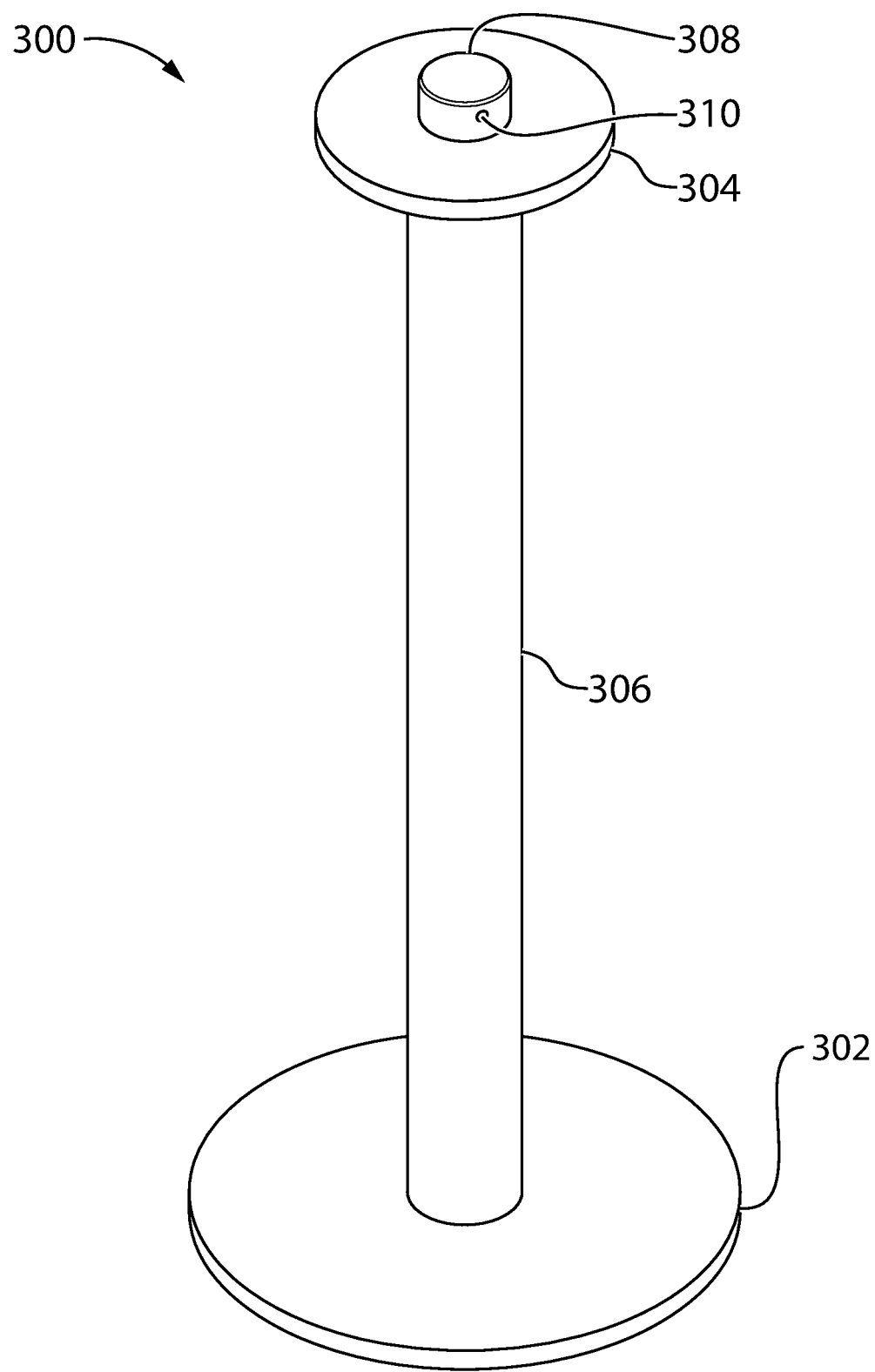
FIG. 3 illustrates a perspective view of a base support that is used as a stand for elevating a dish caddy off the floor according to an exemplary embodiment.

FIG. 3 illustrates a perspective view of a base support 300 that is used as a stand for elevating a dish caddy 100 off the floor according to an exemplary embodiment. The base support 300 includes a circular base member 302 and circular top member 304 connected by a vertical supporting rod 306. The top member 304 includes a circular protrusion 308 that corresponds in diameter to a hole 130 provided through the center of the base member 104 of the dish caddy 100. The circular protrusion 308 extending upward from the top member 304 of the base support 300 includes a locking hole 310 drilled horizontally through the protrusion 308.

Figure 4:
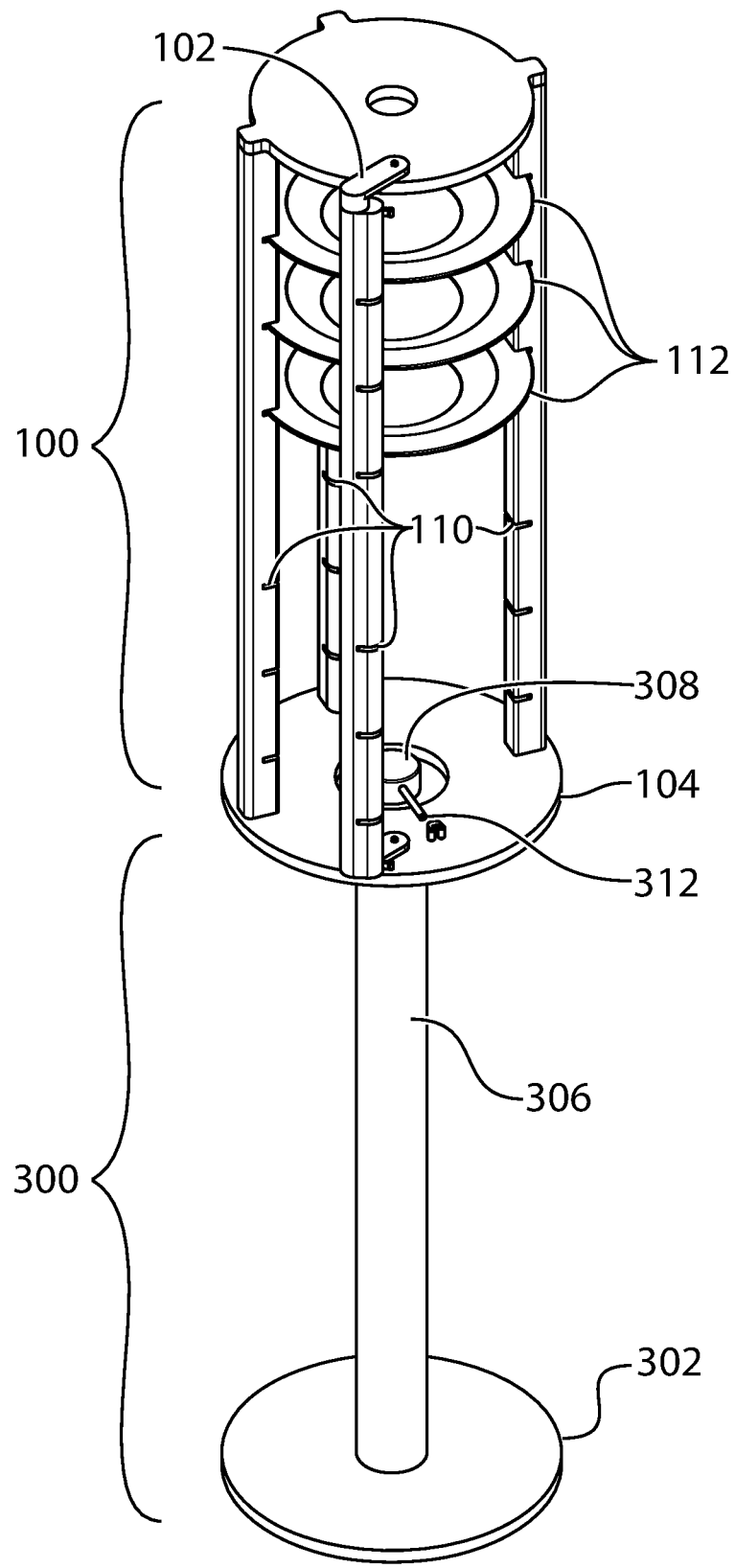
FIG. 4 illustrates a perspective view of the dish caddy of FIG. 1 mounted on the base support of FIG. 3.

FIG. 4 illustrates a perspective view of the dish caddy 100 of FIG. 1 mounted on the base support 300 of FIG. 3. As shown, a locking pin 312 is inserted through the locking hole 310 and helps to ensure the base member 104 of the dish caddy 100 is stable and securely mounted to the top member 304 of the base support 300.

In some restaurant serving situations, it may not be possible to set the base 104 of the dish caddy 100 directly on the surface of a table for serving. For example, the table may be too small or otherwise lack the space. In these situations, a server may carry both the dish caddy 100 and the base support 300 to the side of the table, the caddy 100 in one hand and the base support 300 in the other hand, and then mount the dish caddy 100 on the base support 300. Once mounted, the server may then open the pivot arm 102 and can access dishes 112 therein both for serving food and cleanup. In some embodiments, the underside of the base member 302 of the base support 300 may include wheels to allow the server to easily move the mounted combination of the base support 300 and dish caddy 100 to new locations such as while serving different people at different ends of a large table or to different members of a common group seated at nearby tables.

Figure 5:
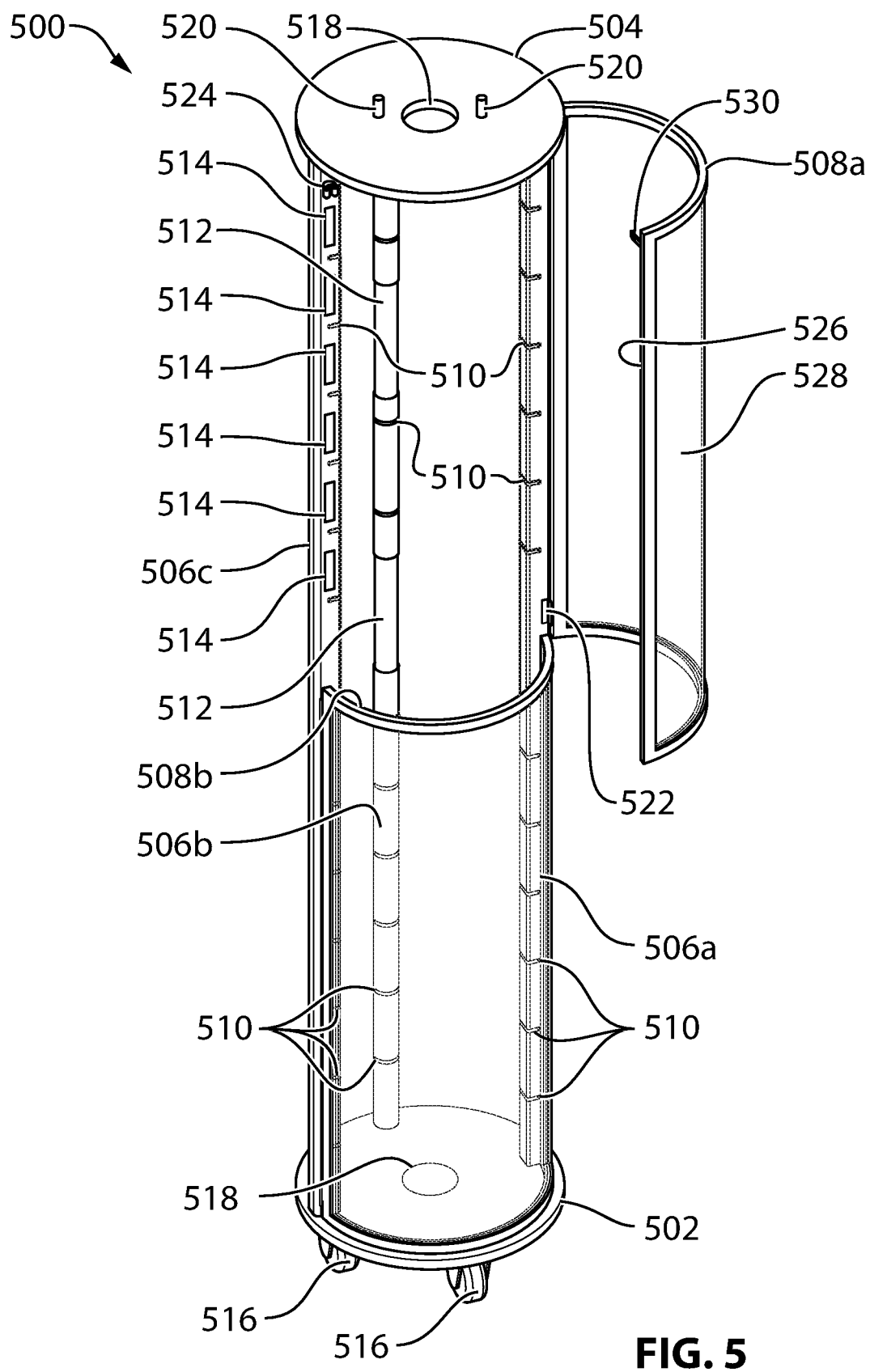
FIG. 5 illustrates a twelve-plate dish caddy according to an exemplary embodiment.

FIG. 5 illustrates a twelve-plate dish caddy 500 according to an exemplary embodiment. The dish caddy 500 includes a base member 502, a top member 504, three supporting rods 506 between the base and top members 102, 104, and a plurality of curved locking windows 508. In the illustrated example, the supporting rods 506 are arranged with substantially equal spacing around one side of the circular base and top members 502. 504. Again, taking the three-hundred and sixty degrees around the circular base/top members 502, 504, a first supporting rod 506a is positioned at zero degrees, a second supporting rod 506b is at ninety degrees, and a third supporting rod 506c is at one-hundred and eighty degrees. The supporting rods 506 include inward-facing notches 510 at staggered heights for accepting the edge of a respective plate 532 that may be inserted therein. In the example shown, the dish caddy 500 includes twelve levels of notches 510 and can therefore hold a plurality of twelve plates 532.

The dish caddy 500 further includes a plurality of hand grips areas 512 located on the upper half of the second supporting rod 506b. Having two hand grips 512 facilitates the user using two hands to lift the entire dish caddy 500 such as to traverse stairs. A writing board 514 is provided adjacent each plate level. The underside of the base member 502 includes a plurality of wheels 516, and both the base and top members 502, 504 include a circular hole 518 in their centers. A plurality of two alignment protrusions 520 are provided on the upwards facing surface of the top member 504.

An upper locking window 508a is attached to the upper portion of the first supporting rod 506a using a plurality of hinges 522 thereby allowing a user to open and close the upper locking window 508a. Likewise, a lower locking window 508b is attached to the lower portion of the third supporting rod 506c using hinges 522 to allow the user to open and close the lower locking window 508b. The curved locking windows 508 act as half-moon-shaped panels to keep plates 532 from falling out. The windows 508 are hinged and press against the outside edges of the plates 532 and hold the plates 532 in position between the windows 508 and the center supporting rod 506b within the dish caddy 500. Roller latches 524 are provided on the inside surfaces of the base and top members 502, 504 near the position where the curved windows 508 make contact with those members 502, 504. The locking windows 508 are formed by a frame 526 and a transparent window section 528 and tabs 530 are mounted on the inward surfaces of the frame 526. The tabs 530 engage with the roller latches 524 in order to hold the respective window 508 in a closed position. To open a locking window 508, the user pulls the outward on the edge of the frame 526 to remove the tab 530 from the roller latches 524 thereby allowing the locking window 508 to freely rotate around the hinges 522 into the open position. Notches 510 at the same plurality of plate levels may also be included on the inward-facing surfaces of the windows 508 and/or window frames 526.

Figure 6:
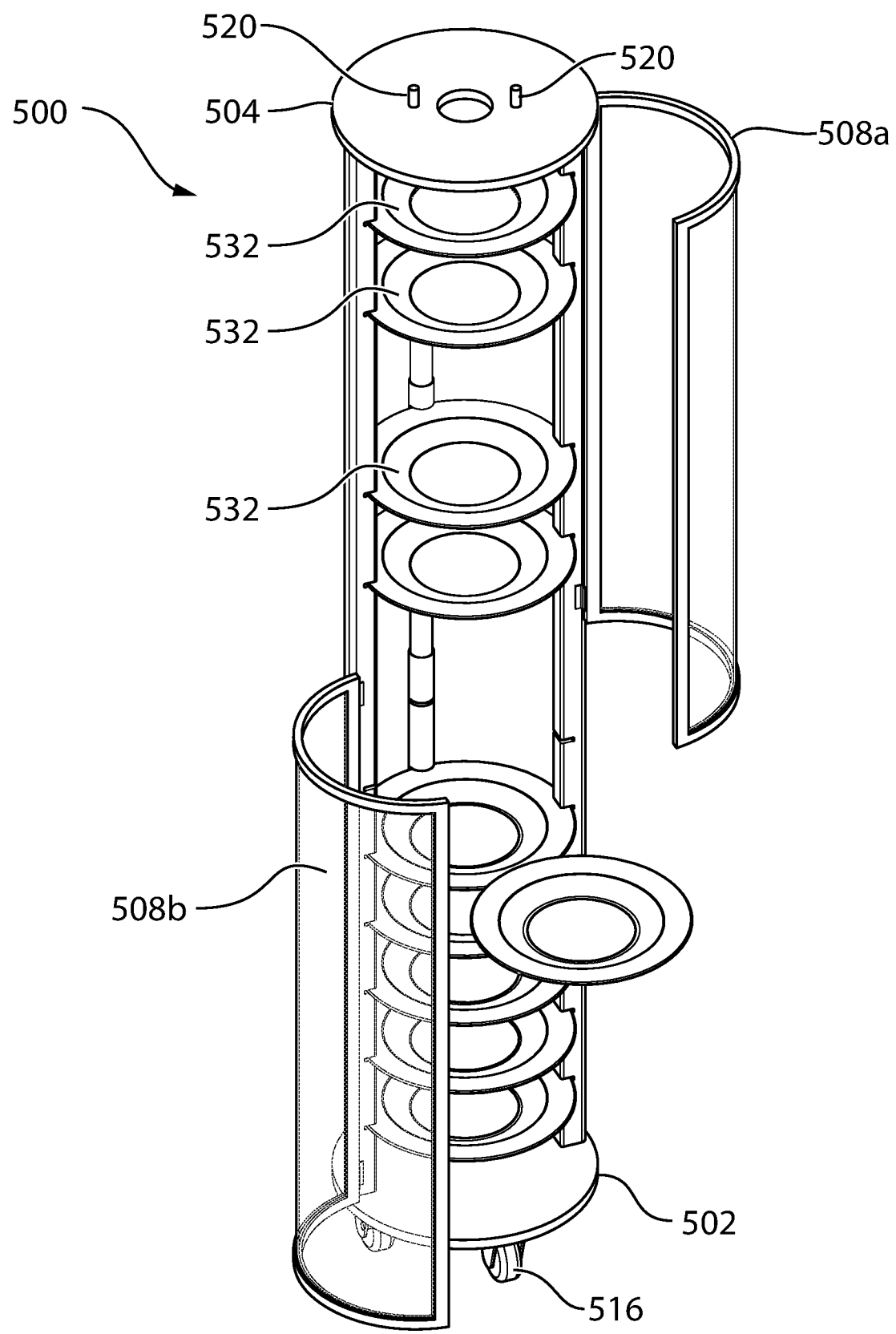
FIG. 6 illustrates a plurality of plates mounted on the dish caddy of FIG. 5.

FIG. 6 illustrates a plurality of plates 532 mounted on the dish caddy 500 of FIG. 5. To mount a plate 532, the user inserts the edge of the plate 532 into the inner-facing notches 510 at a particular level. As illustrated, notches 510 are not provided at the level of the hand grips 512 thereby allowing the user to grip both hand grips 512 even when the dish caddy 500 is fully loaded with plates 532 and food.

Figure 7:
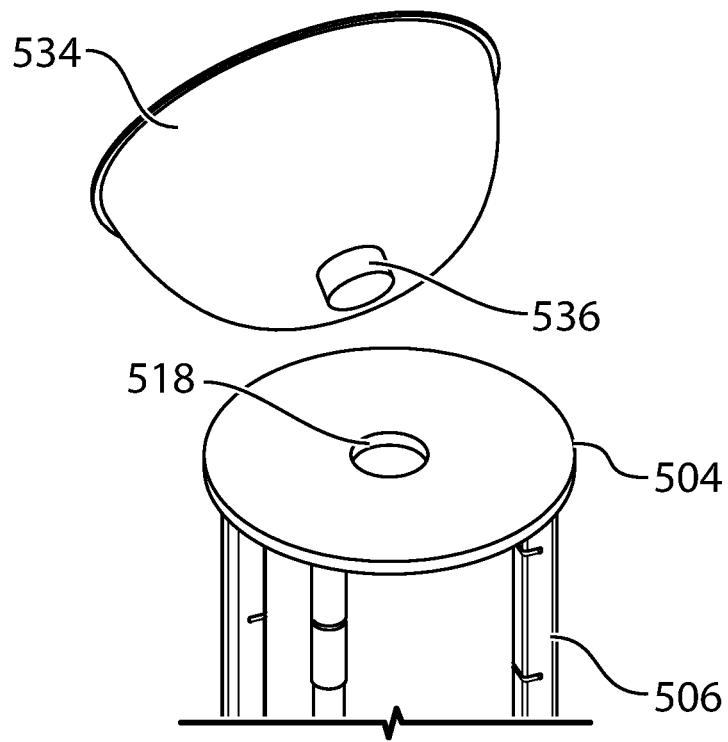
FIG. 7 illustrates a bowl for mounting on the top member of the dish caddy of FIG. 5 according to an exemplary embodiment.
Figure 8:
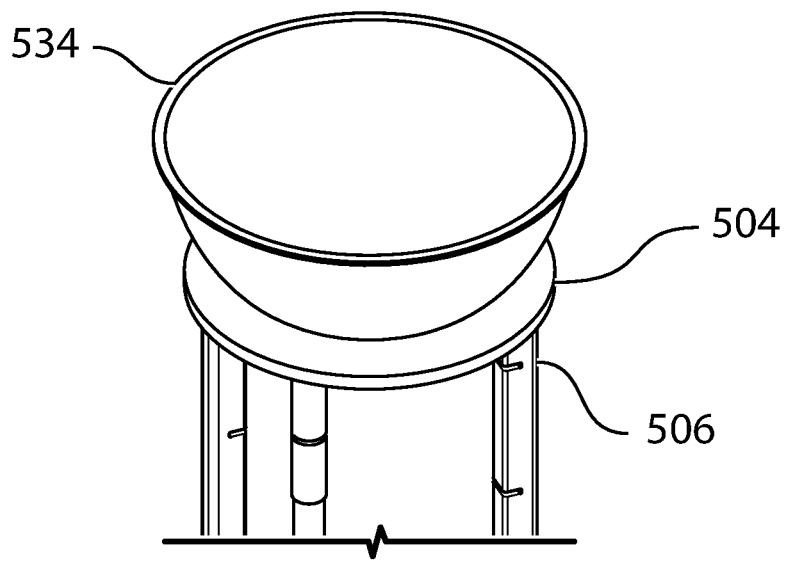
FIG. 8 illustrates the bowl mounted on the top member of the dish caddy of FIG. 5.

FIG. 7 illustrates a bowl 532 for mounting on the top member 504 of the dish caddy 500 of FIG. 5 according to an exemplary embodiment. The bowl 534 includes a downward facing protrusion 536 that is circular in shape and has a diameter to match the center hole 518 of the upper member. FIG. 8 illustrates the bowl 534 mounted on the top member 504 of the dish caddy 500 of FIG. 5. Particularly for cleanup, a server or clean-up staff may scrape uneaten food into the bowl 534 prior to loaded used dishes 532 onto the dish caddy 500. The downward facing protrusion 536 may also include a locking hole and be secured on the underside of the top member 504 with a locking pin similar to how the six-plate dish caddy 100 was secured to the base support 300 in FIG. 4.

Figure 9:
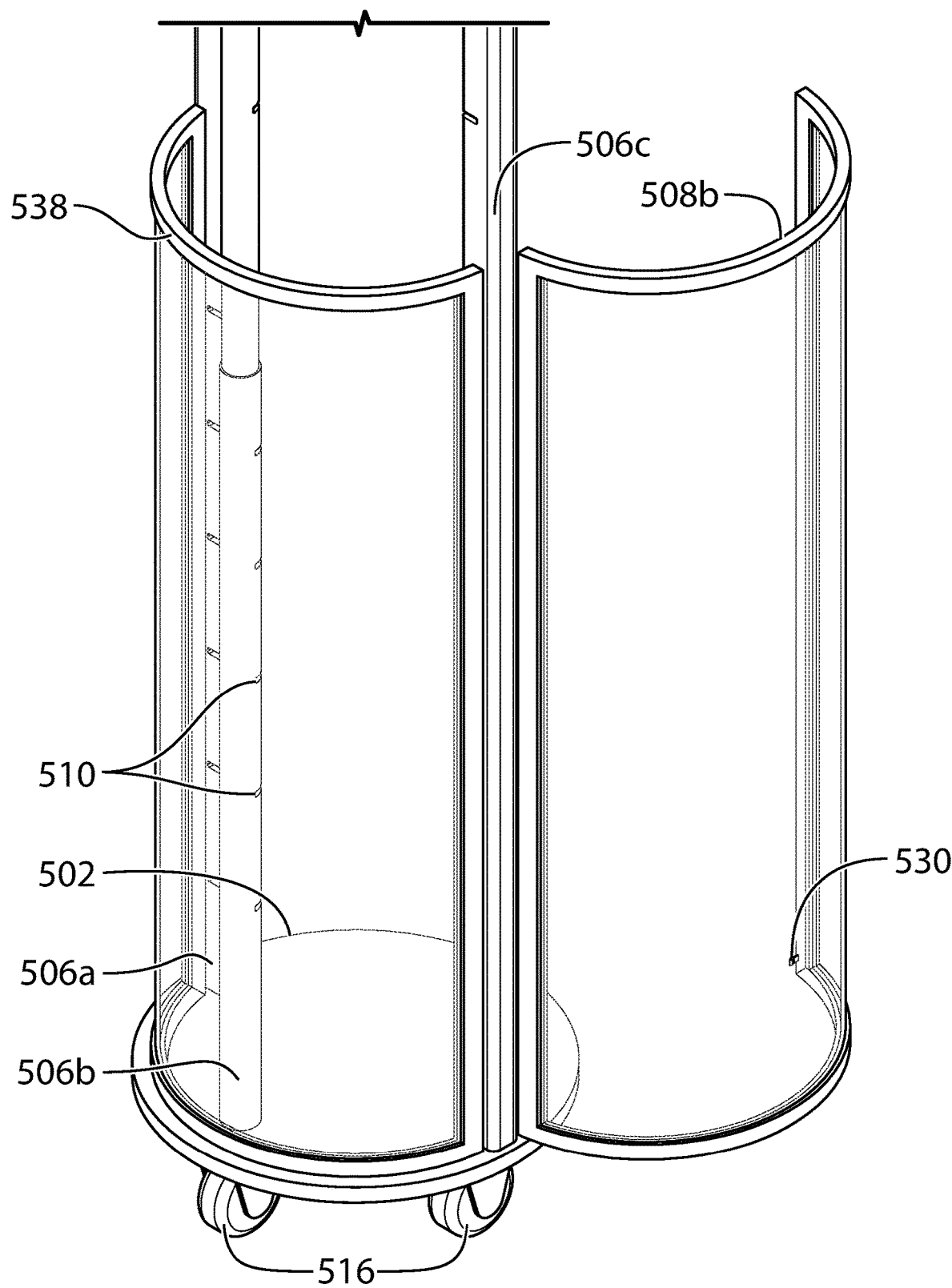
FIG. 9 illustrates a back window mounted to the base member of the twelve-plate dish caddy of FIG. 5.

FIG. 9 illustrates a back window 538 mounted to the base member 502 of the twelve-plate dish caddy of FIG. 5. The back window 538 has substantially the same curvature as the lower hinged locking window 508b and wraps around the outside of the second supporting rod 506b such that, when the lower locking window 508b is in the closed positioned, together the back window 538 and the lower locking window fully 508b surround the area where the bottom five plates 532 are held within the dish caddy 500.

One benefit of having the lower back window 538 installed during dish transport is to help prevent any dust on the floor that may inadvertently be kicked upwards by people within the vicinity of the dish caddy 500 from contaminating food on the lower plates 532 within the dish caddy 500. Beneficially, the hand grips 512 on the second supporting rod 506b are not blocked by the back window 538 and a server may still easily carry and lift the dish caddy 500 via the hand grips 512 even when the back window 538 is installed. In some embodiments, the back window 538 is curved transparent material such as Plexiglass® and is permanently mounted in place. However, in other embodiments, the back window 538 may be removable by a user.

Figure 10:
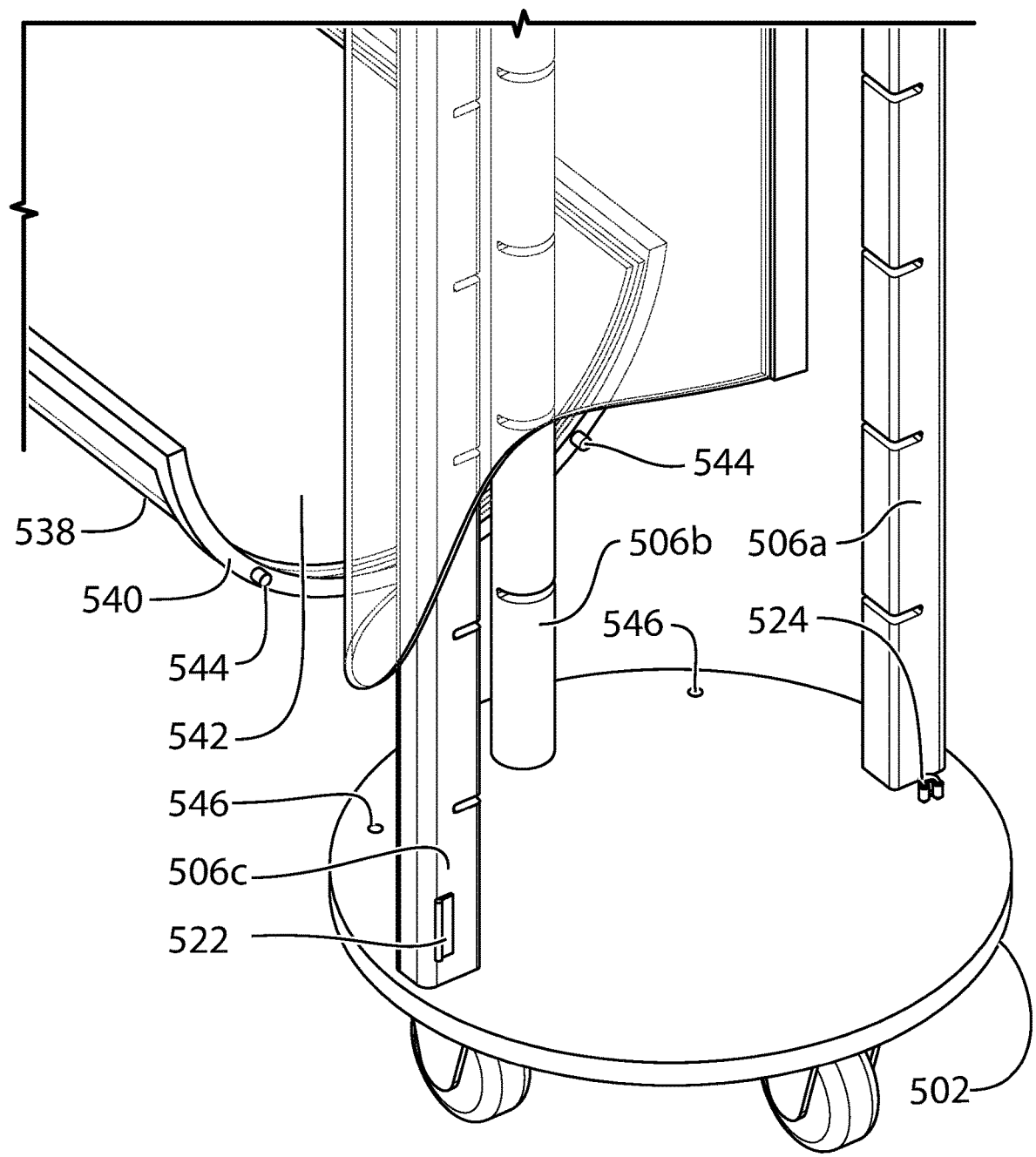
FIG. 10 illustrates installation and removal of the back window to the dish caddy of FIG. 5.

FIG. 10 illustrates installation and removal of the back window 538 to the dish caddy 500 of FIG. 5. As illustrated, the back window 538 is formed by a frame 540 with transparent window section 542 mounted thereon. The lower edge of the frame 540 includes a plurality of protruding members 544 that extend downward. A corresponding plurality of back window mounting holes 546 are installed on the upper surface of the base member 502 for accepting the downward protruding members 544 of the back window 538.

Figure 11:
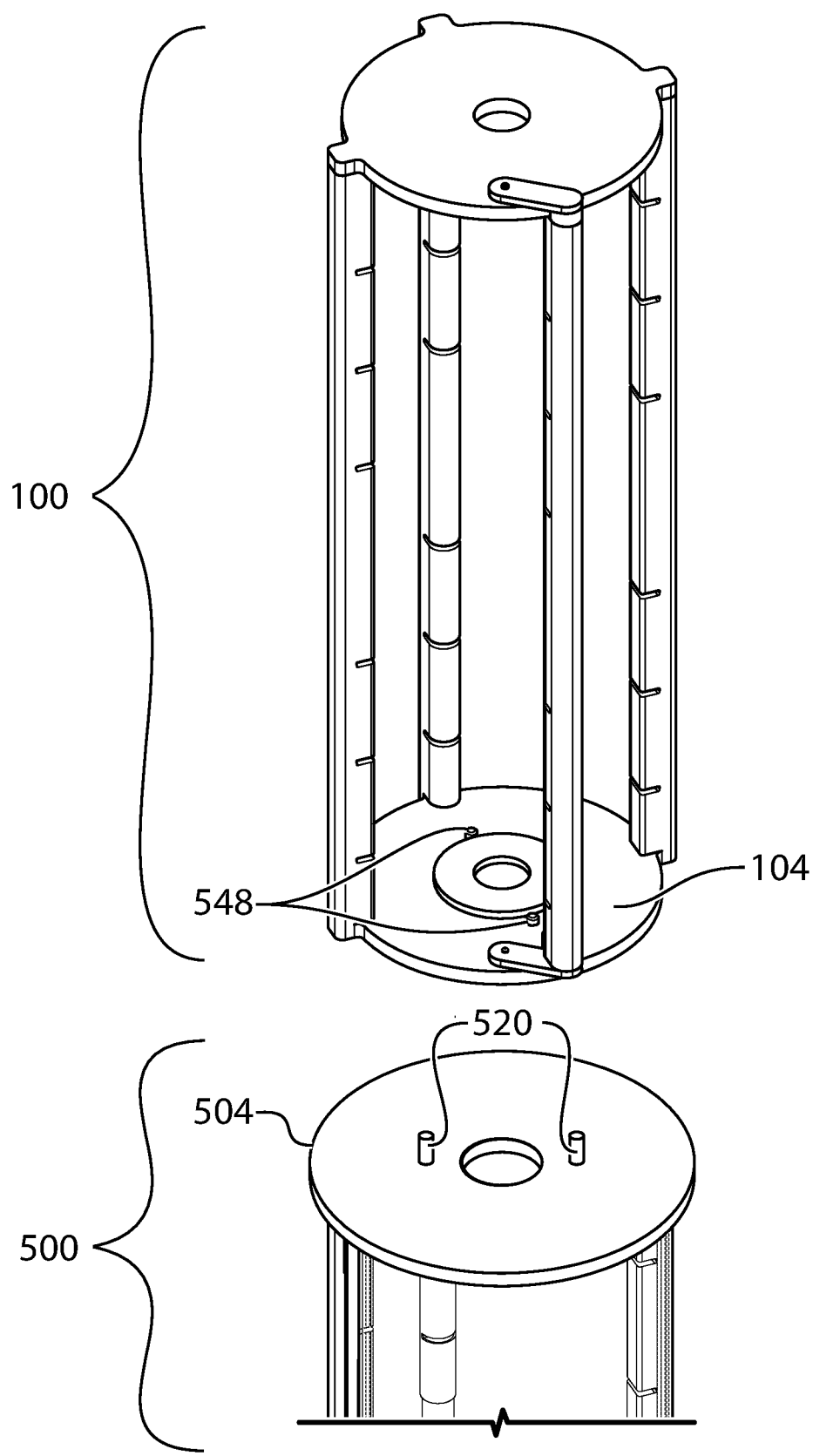
FIG. 11 illustrates how the six-plate dish caddy of FIG. 1 can be mounted on top of the twelve-plate dish caddy of FIG. 5.

FIG. 11 illustrates how the six-plate dish caddy 100 of FIG. 1 can be mounted on top of the twelve-plate dish caddy 500 of FIG. 5. As illustrated, the base member 104 of the six-plate dish caddy has two mounting holes 548 that correspond in position and size with the upward extending alignment protrusions 520 on the upper surface of the top member 504 of the twelve-plate dish caddy 500. Clamps or other locking clips or locking pins may be applied to the top of the protrusions 520 after placement of the top caddy 100. In this way, the clamps secure the stacking of dish caddies 100, 500.

Figure 12:
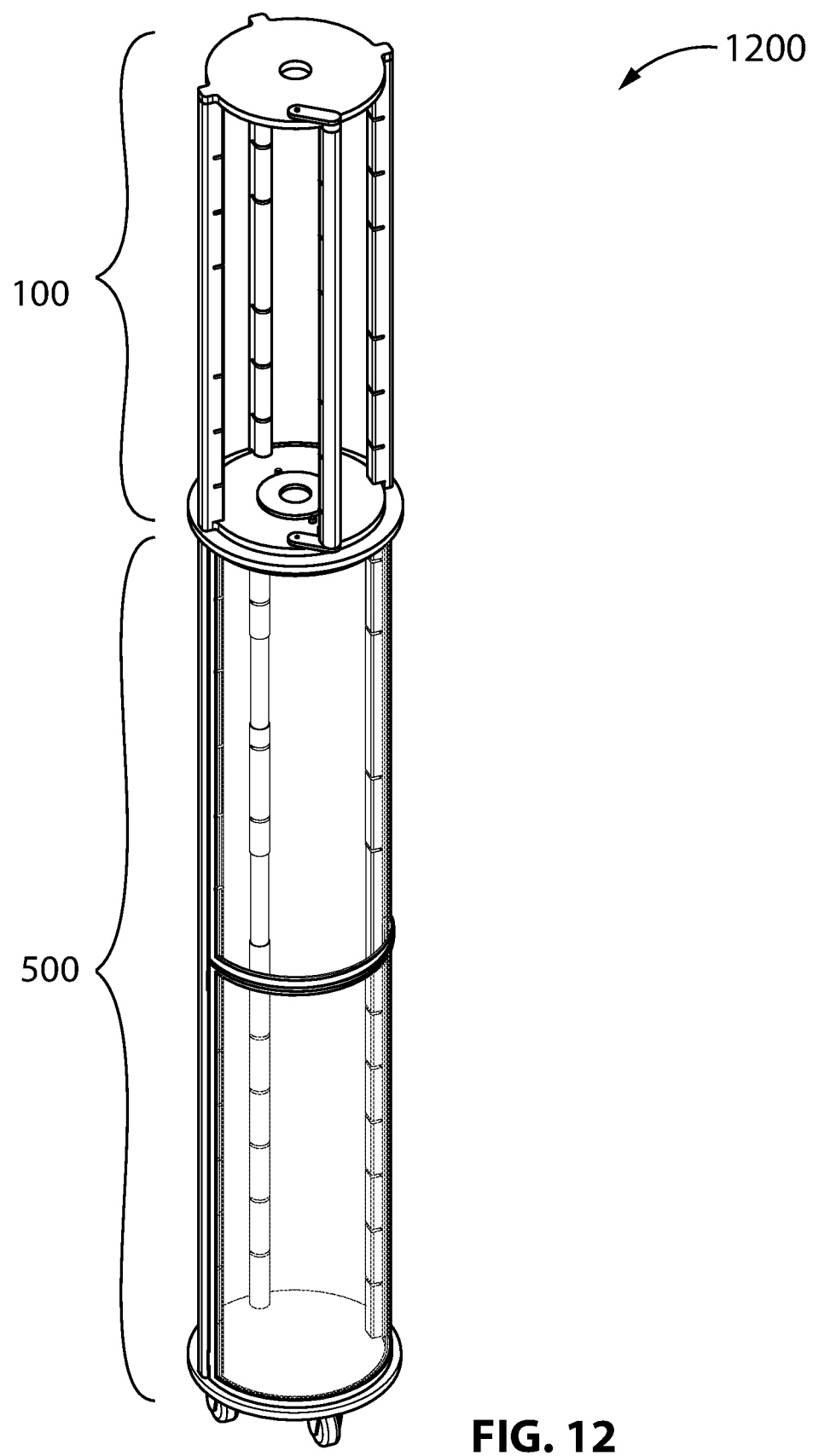
FIG. 12 illustrates the six-plate dish caddy of FIG. 1 mounted on the top of the twelve-plate dish caddy of FIG. 5 thereby forming an eighteen-plate dish caddy assembly.

FIG. 12 illustrates the six-plate dish caddy 100 of FIG. 1 mounted on the top of the twelve-plate dish caddy 500 of FIG. 5 thereby forming an eighteen-plate dish caddy assembly 1200. That the various dish caddies 100, 500 are stackable in this embodiment may be beneficial to support serving food to large groups where a single dish caddy 100, 500 may be insufficient. An experienced server may simultaneously carry the six-plate dish caddy 100 of FIG. 1 in one hand and push the twelve-plate dish caddy 500 along the floor using their other hand. Upon arrival at the table, the server can mount the six-plate dish caddy 100 on top of the twelve-plate dish caddy 500 and then serve food to the table. In this way, a single server can serve food to a large group. Other combinations of dish caddies and sizes can be simultaneously utilized in a similar size such as with two six-plate dish caddies 100 or even two twelve-plate dish caddies 500.

Figure 13:
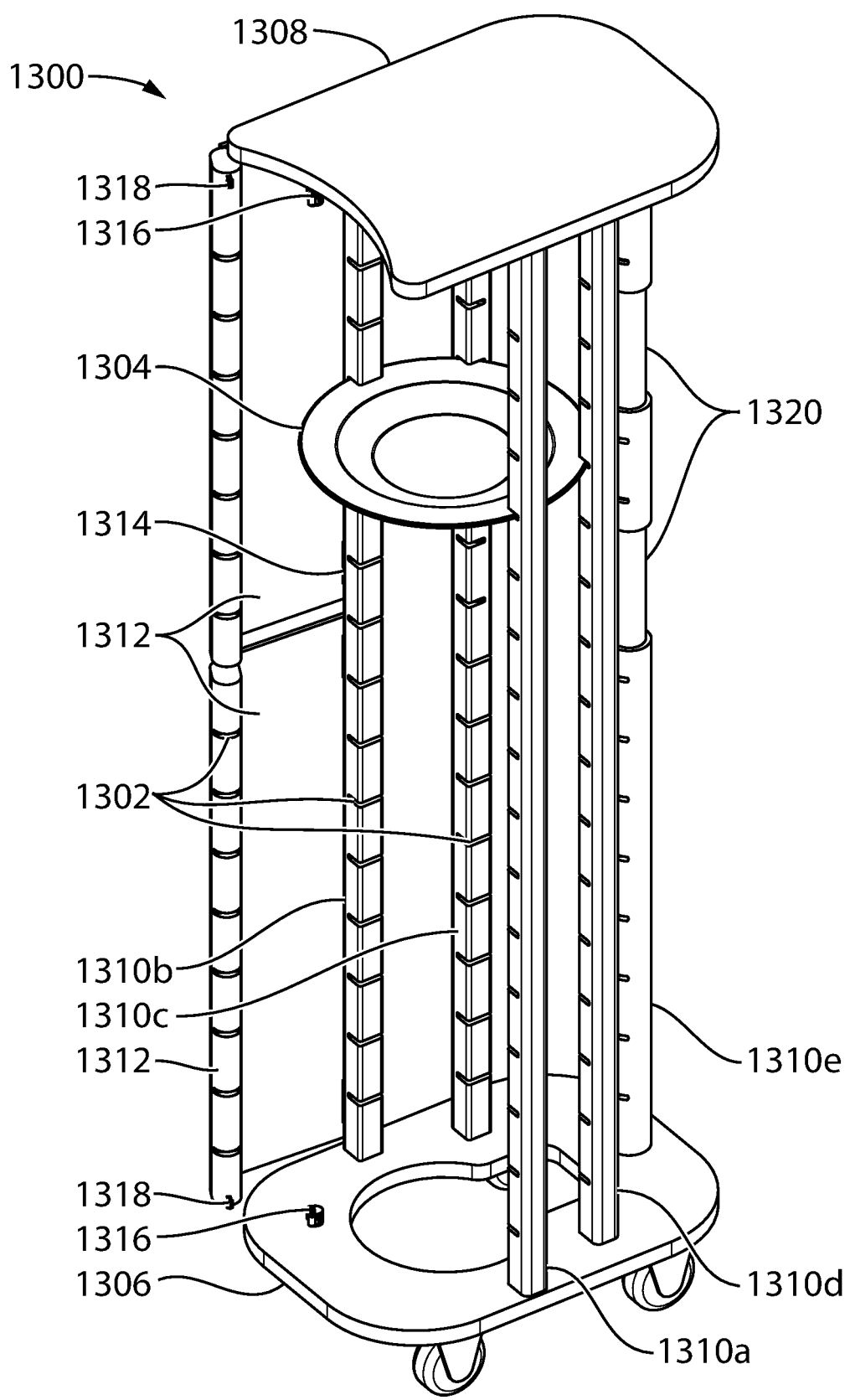
FIG. 13 illustrates a sixteen-plate dish caddy with universal notches supporting holding multiple sizes of plates according to an exemplary embodiment.

FIG. 13 illustrates a sixteen-plate dish caddy 1300 with universal notches 1302 supporting holding multiple sizes of plates 1304 according to an exemplary embodiment. The dish caddy 1300 includes a base member 1306, a top member 1308, and a plurality of supporting rods 1310 connected between the base and top members 1306, 1308. The supporting rods 1310 in this embodiment include two pairs of side supporting rods 1310a,b,c,d and a center supporting rod 1310e. A first pair of side supporting rods 1310a,b include a first supporting rod 1310a opposite a second supporting rod 1310b. A second pair 1310c,d includes a third supporting rod 1310c and a fourth supporting rod 1310d. A pivot door 1312 is connected to the second supporting rod 1310b via a plurality of hinges 1314. Again, roller latches 1316 are mounted on the inside surfaces of the base member 1306 and the top member 1308 for accepting corresponding tabs 1318 on the pivot door 1312 for holding the pivot door 1312 in a closed positioned when desired by the user.

Like the previously illustrated embodiment, the inner-facing sides of the supporting rods 1310 in this embodiment include notches 1302. The notches 1302 at the levels of two separate hand grips 1320 are adapted to only accommodate large plates 1304. In contrast, the notches 1302 at the other levels above and below the hand grips 1320 are adapted to accommodate both large diameter and small diameter plates 1304.

Figure 14:
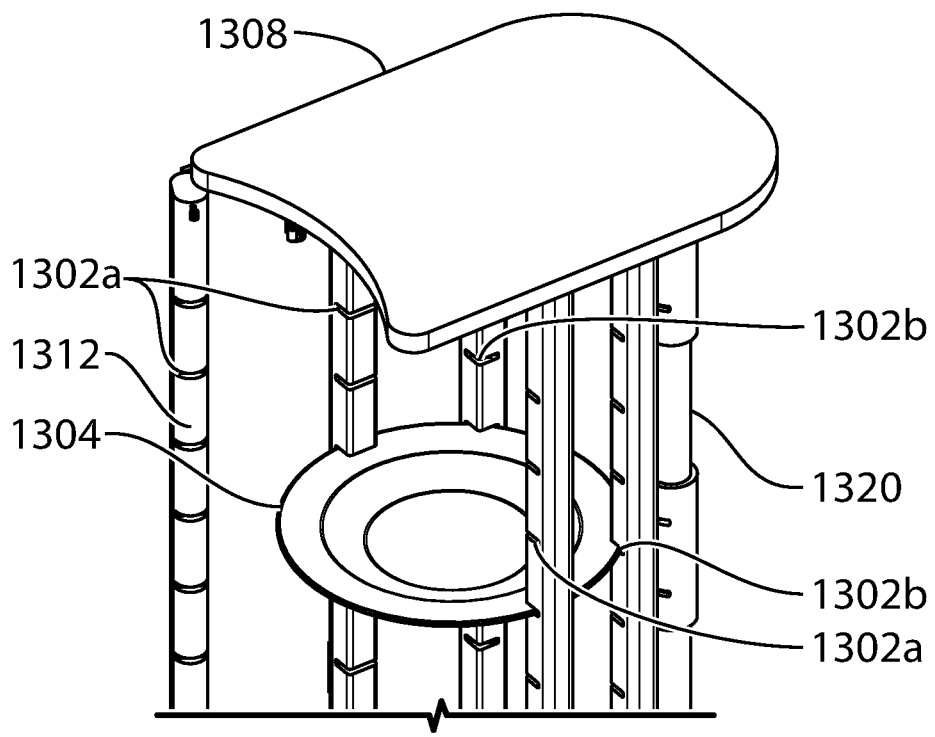
FIG. 14 illustrates the dish caddy of FIG. 13 holding a large diameter plate at a large-plate-only notch level with the pivot door in an open position according to an exemplary embodiment.
Figure 15:
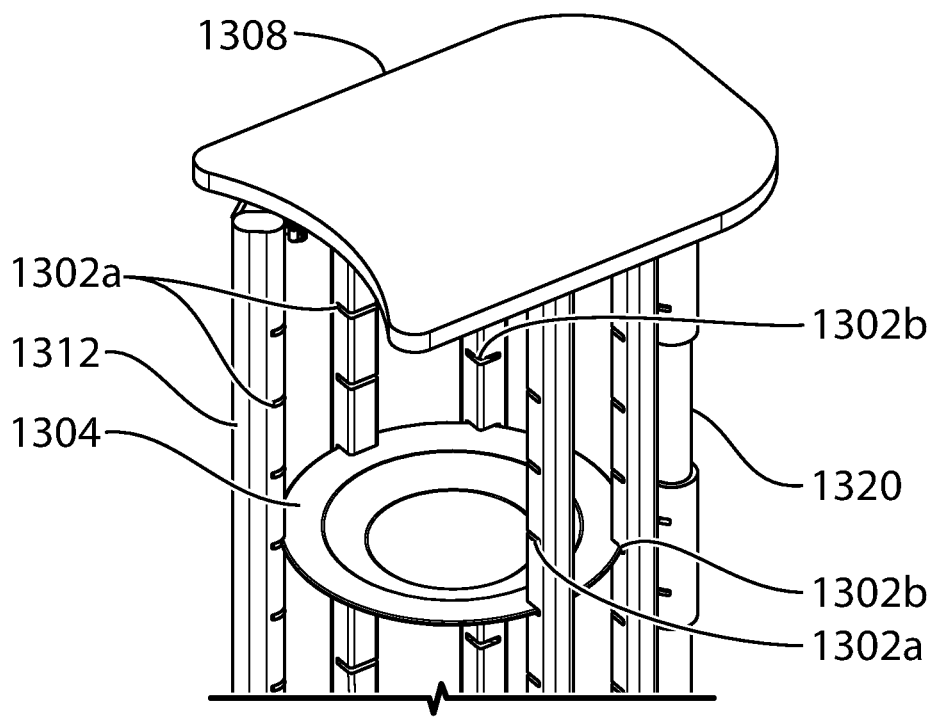
FIG. 15 illustrates the dish caddy of FIG. 14 after the pivot door has been moved to the closed position.

As illustrated more clearly in FIGS. 14 and 15, there are two types of notches 1302. A first type of notches 1302a that accommodate large plates have a flat slot across the inner surfaces of the second pair of supporting rods 1310a,b and at least a forward corner slot across part of the front and inner surface of the second pair of supporting rods 1310c,d. To accommodate large-diameter plates 1304, no notches 1302 are required on the center supporting rod 1310e. In particular, there are no notches 1302 directly on the center supporting rod 1310e at the level of the hand grips 1320, and the notches 1302 on the second pair of supporting rods 1310c,d at the level of the hand grips 1320 only include forward corner slots. In this way, the notches 1302 at the level of the hand grips 1320 only support large plates 1304 and the user's hand can wrap around the hand grips 1320 without interfering with any plates 1304 or food held within the dish caddy 500.

FIG. 14 illustrates the dish caddy 1300 of FIG. 13 holding a large diameter plate 1304 at a large-plate-only notch level with the pivot door 1312 in an open position according to an exemplary embodiment. Upon insertion of the plate 1304 into the dish caddy 1300, the edge of the plate 1304 is positioned within four notches 1302 including slot notches 1302a on the first set of supporting rods 1310a,b and the forward corner notches 1302b on the second pair of supporting rods 1310c,d. In this way, the plate 1304 is held by a total of four notches 1302a, 1302b and remains stable even with the pivot door 1312 in the open position.

FIG. 15 illustrates the dish caddy of FIG. 14 after the pivot door 1312 has been moved to the closed position. To secure the plate 1304 within the dish caddy 1300, the slot notch 1302a across the pivot door 1312 holds a fifth part of the edge of the plate 1304. While the door 1312 is in the closed position, the plate 1304 is held securely at five points around its edge and cannot be removed or fall from the dish caddy 1300.

Figure 16:
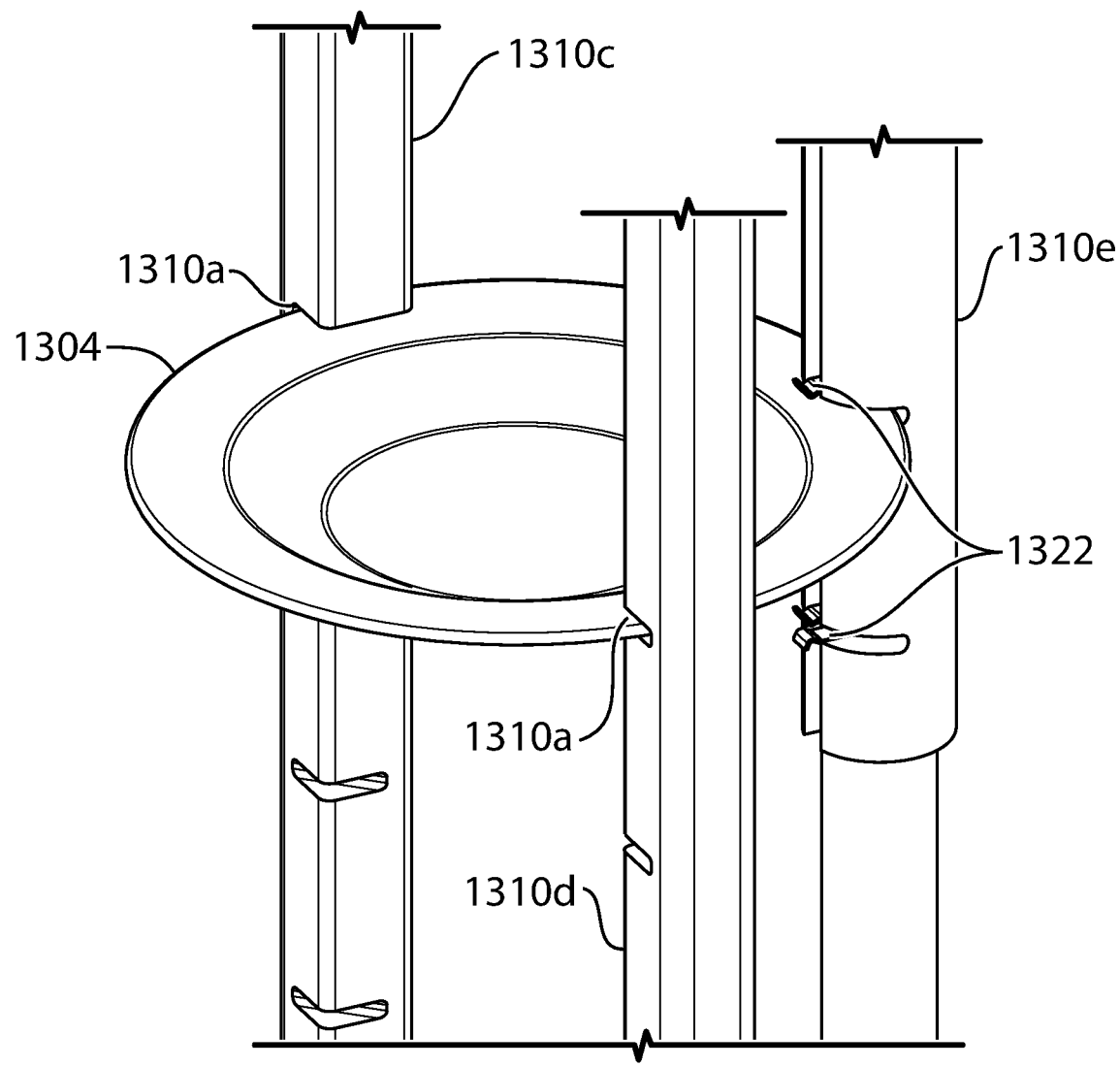
FIG. 16 illustrates the dish caddy of FIG. 13 holding a small diameter plate in a universal plate size notch level according to an exemplary embodiment.

FIG. 16 illustrates the dish caddy 1300 of FIG. 13 holding a small diameter plate 1304 in a universal plate size notch level according to an exemplary embodiment. Upon insertion of the plate 1304 into the dish caddy 1300, the edge of the plate 1304 is positioned within three notches including slot notches 1302a on the second set of supporting rods 1310c,d and the center supporting rod 1310e. The slot notch 1302a on the center supporting rod 1310e includes a roller latch turned on its side to act as a plate edge gripper 1322 that holds on to the edge of the plate 1304 upon plate 1304 insertion.

Figure 17:
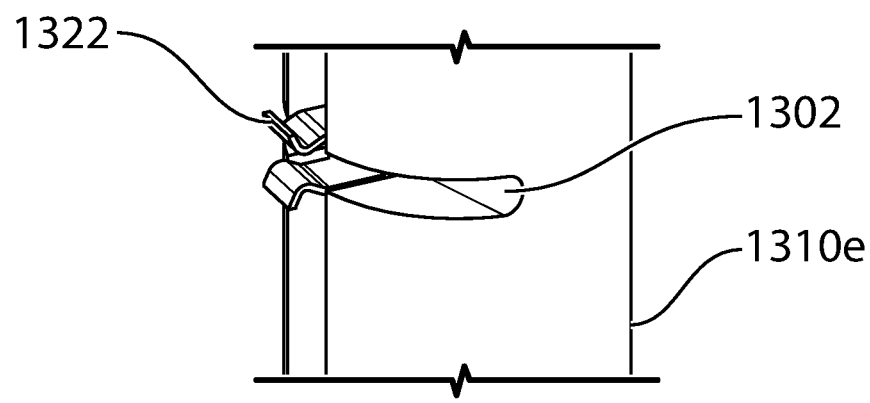
FIG. 17 illustrates a close-up perspective view of a plate edge gripper within the inner-facing notch in the center supporting rod at positions supporting smaller diameter plates according to an exemplary embodiment.

FIG. 17 illustrates a close-up perspective view of a plate edge gripper 1322 within the inner-facing notch 1302 in the center supporting rod 1310e at positions supporting smaller diameter plates 1304 according to an exemplary embodiment. In order to remove the edge of the plate from the gripper 1322, the user must pull the plate 1304 forward with enough force to overcome a threshold friction force achieved by the gripper 1322. In this way, the gripper 1322 holds the plate 1304 securely in place even though the plate 1304 is only being held by three points of contact and can be removed by moving the plate 1304 laterally in the forward direction. The pivot door 1312 of the dish caddy 1300 does not interact with the small plates 1304; instead, the small plates 1304 in this embodiment are held in place by the friction forces applied by the plate edge gripper 1322 in the notch 1302 of the center supporting rod 1310e.

Figure 18:
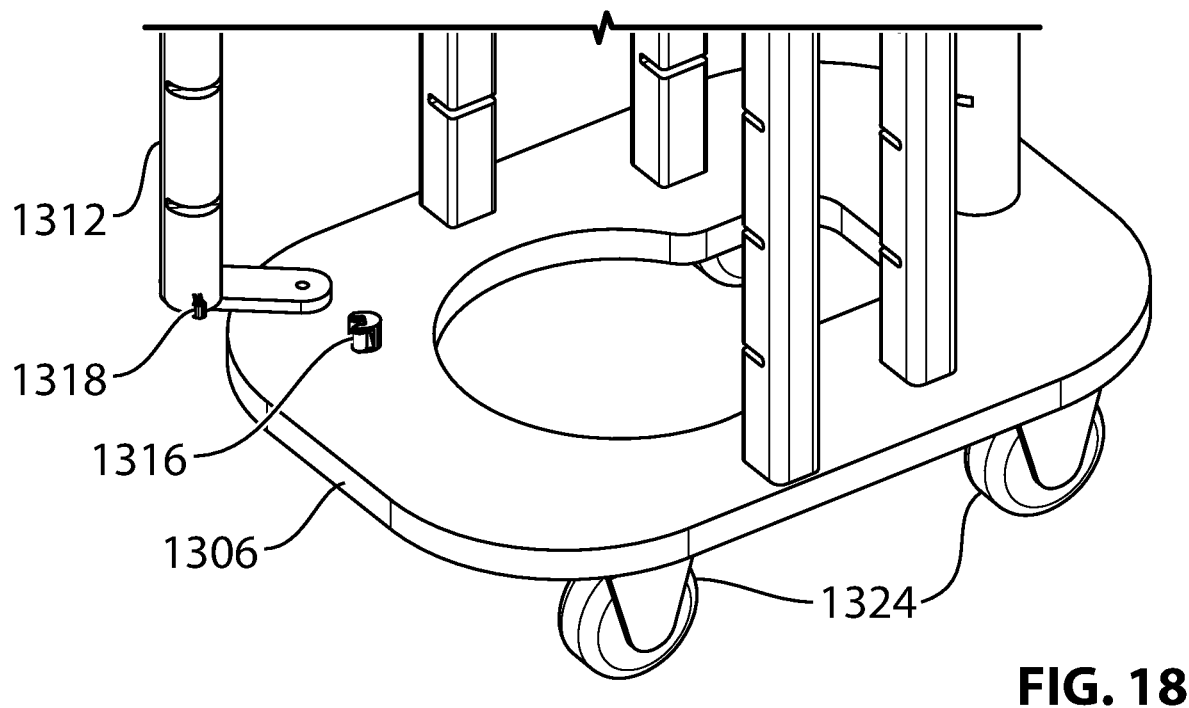
FIG. 18 illustrates a perspective view of the door latch mechanism on the pivot door and swivel caster wheels under the bottom surface of the base member of the dish caddy of FIG. 13 according to an exemplary embodiment.

FIG. 18 illustrates a perspective view of the door latch mechanism on the pivot door 1312 and swivel caster wheels 1324 under the bottom surface of the base member 1306 of the dish caddy 1300 of FIG. 13 according to an exemplary embodiment. The wheels 1324 allow the dish caddy 1300 to be moved along flat surfaces under control of the user holding the handle grips 1320 without the user needing to lift the entire weight of the dish caddy 1300 and dishes 1304 and food held therein. However, when needed, such as to go up and down stairs, the entire caddy 1300 can easily be lifted by a single user holding the hand grips 1320. Again, the door latch mechanism includes a tab 1318 mounted on the inner facing surface of the pivot door 1312 that engages with a roller latch 1316 mounted on the inner facing surface of the base member 1306. A similar door latch mechanism is provided on the top member 1308.

Figure 19:
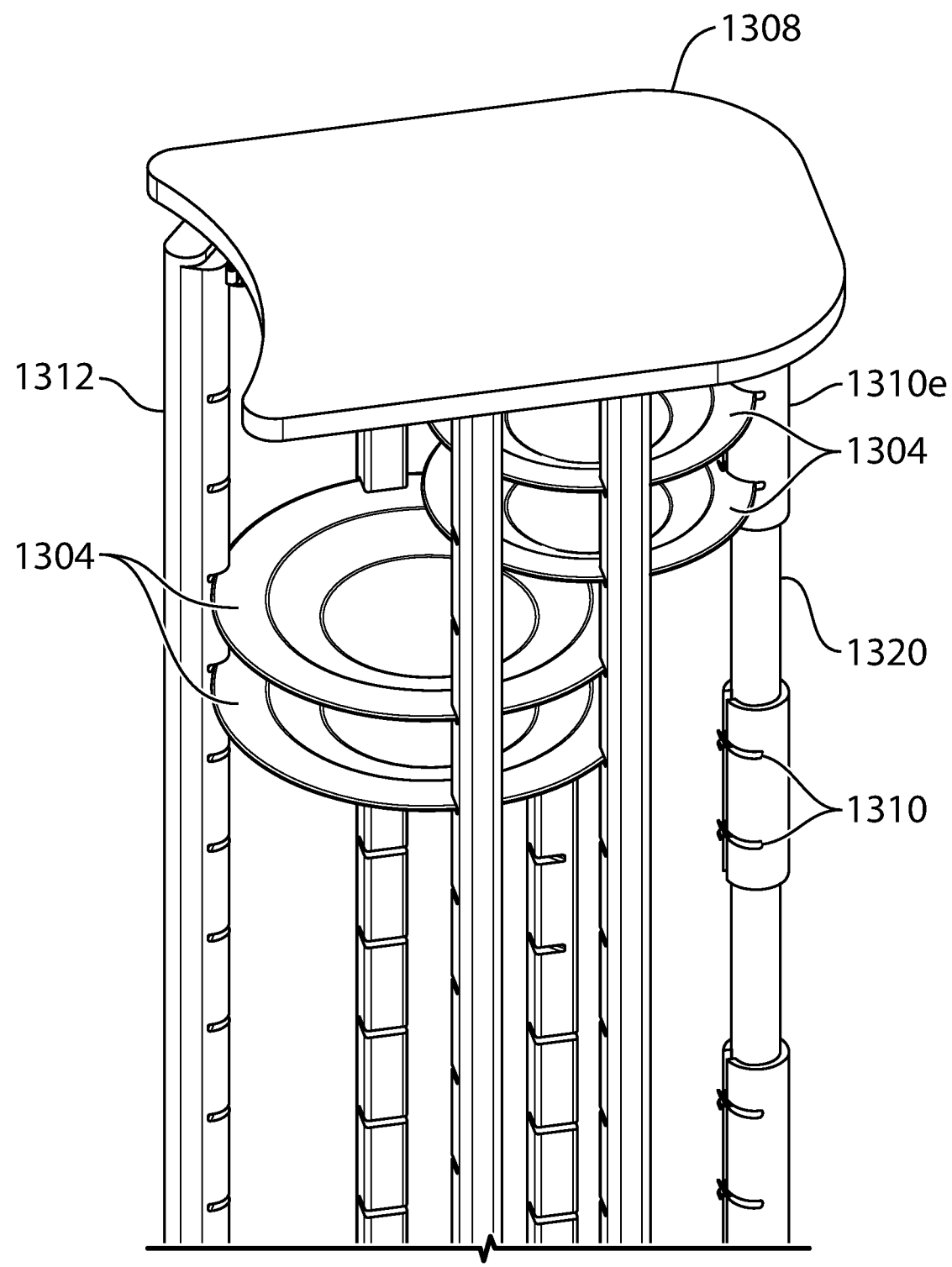
FIG. 19 illustrates a perspective side-view of the hand grip area of the dish caddy of FIG. 13.

FIG. 19 illustrates a perspective side-view of the hand grip area 1320 of the dish caddy 1300 of FIG. 13. As illustrated, at the vertical level of the hand grips 1320, only large plates 1304 can be accommodated. There are no inner-facing notches 1302 on the center supporting rod 1310e in the area of the hand grips 1320. The notches 1302 at these levels are large-plate-only as illustrated in FIG. 14. In this way, the user's hand can wrap fully around the hand grips 1320 on the center supporting rod 1310e without interfering with any plates 1304 or food in the area of the hand grips 1320. At the levels above and below the hand grips 1320, the notches 1310 are of the universal-plate design and can accommodate both large and small diameter plates 1304.

Figure 20:
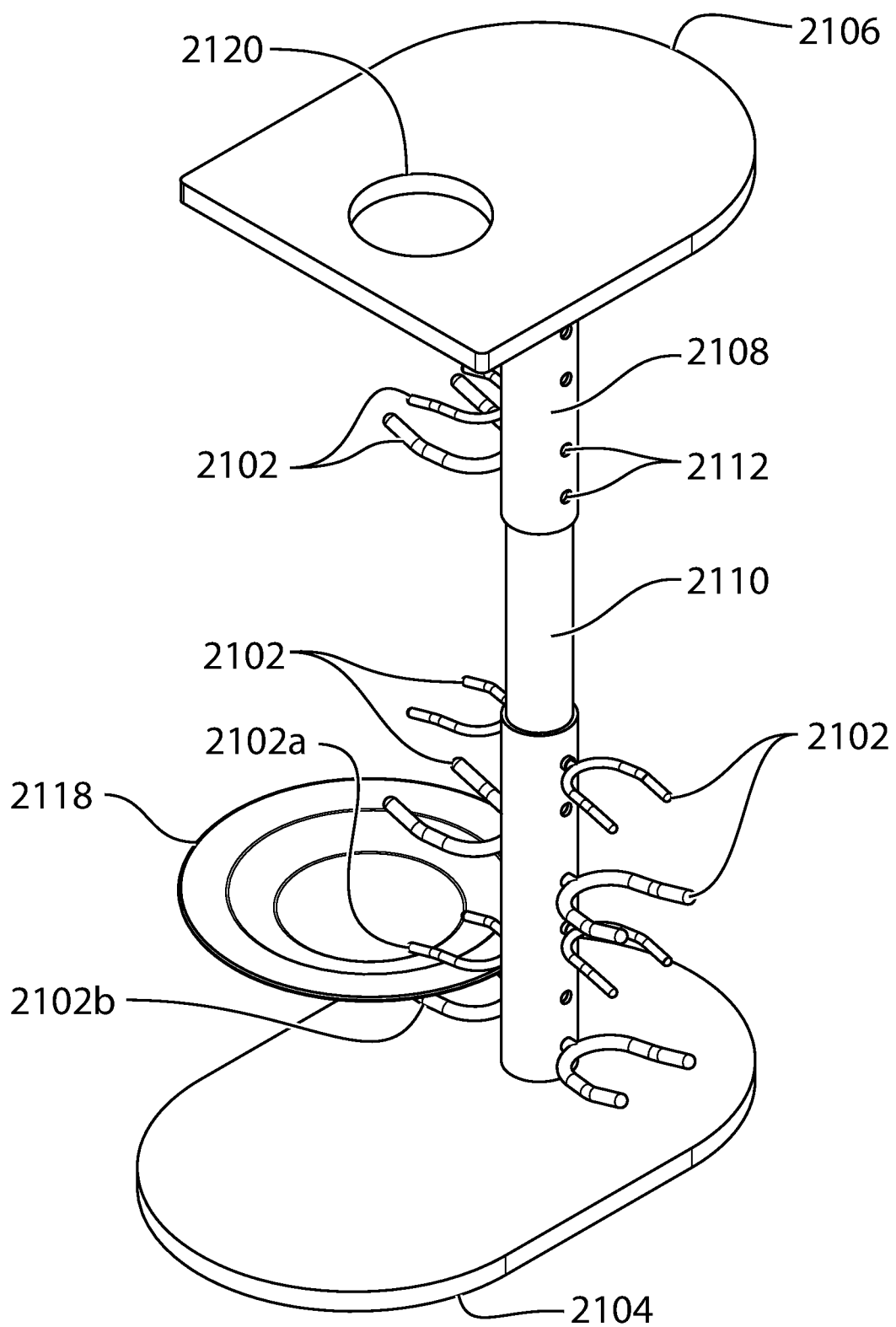
FIG. 20 illustrates a dish caddy with adjustable dish holders according to an exemplary embodiment.

FIG. 20 illustrates a dish caddy 2100 with adjustable dish holders 2102 according to an exemplary embodiment. The dish caddy 2100 includes a base member 2104 and a top member 2106 separated by a single supporting rod 2108. The supporting rod 2108 includes a hand grip 2110 in a center area and a plurality of holes 2112 disbursed on either side of the supporting rod 2108 and distributed at different vertical heights. The dish caddy 2100 further includes a plurality of removable Y-shape plate holders 2102.

Figure 21:
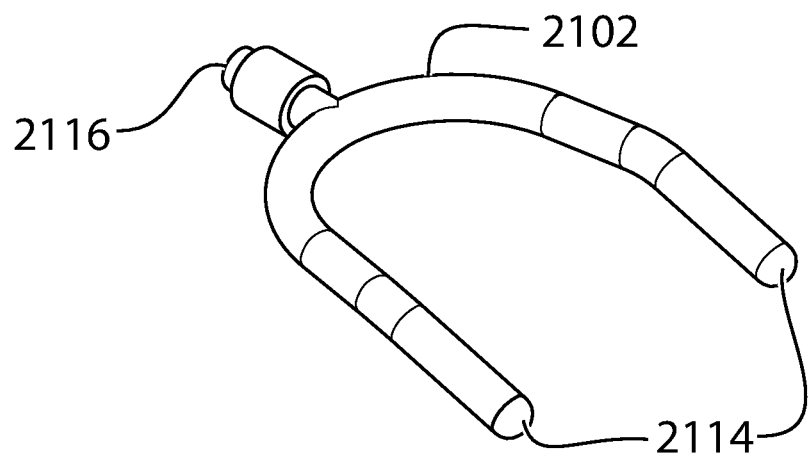
FIG. 21 illustrates a perspective view of a Y-shaped plate holder of FIG. 20.

FIG. 21 illustrates a perspective view of a Y-shaped plate holder 2102 of FIG. 20. The dish holders 2102 have two prongs 2114 with a slight arc that extend from a circular trunk 2116 with a diameter corresponding to the diameter of the holes 2112 in the supporting rod 2108. The circular trunk 2116 can be inserted into and removed from the various holes 2112 by a user in order to arrange the dish holders 2102 at desired levels on the supporting rod 2108.

In the embodiment illustrated in FIG. 20, the dish holders 2102 are provided in two sizes: a slightly larger size that is usually positioned by the user to be on the underside of a dish 2118 such as a plate or bowl, and a slightly smaller size that is usually positioned by the user to be above the dish 2118. The dish holder 2102 under the dish 2118 arcs upwards slightly and the dish holder 2102 above the dish 2118 arcs downwards slightly. Together, a pair of Y-shaped plate holders 2102 above and below a dish 2118 act as pressure plates that apply pressure to both the top and bottom edges or surfaces of a dish 2118 held therebetween.

For dishes 2118 that are generally flat such as supper plates, the upper and lower dish holders 2102 can be inserted into adjacent holes 2112 on the supporting rod 2108. For example, in FIG. 20 an upper dish holder 2102a and lower dish holder 2102b inserted into two adjacent holes 2112 hold a plate 2118. Alternatively, for dishes 2118 that have higher side walls such as bowls, the upper and lower dish holders 2102a, 2102b can be inserted into holes 2112 on the supporting rod 2108 with a desired number of intermediate holes 2112 left empty therebetween. For instance, a restaurant may utilize bowls with height of two inches and predetermine that the upper and lower dish holders 2102a, 2102b holding such a bowl should be inserted into the supporting rod with three empty holes 2112 therebetween.

Many restaurants utilize four types/sizes of dishes:
pasta bowls
small plate (e.g., 16.5 cm diameter)
large plate (e.g., 19 cm diameter)
specialty (oval) plate e.g., salmon, lobster.

The distribution of the holes 2112 along the supporting rod 2108 may beneficially allow any of the typical sized dishes 2118 used by a restaurant to be supported by the dish caddy 2100. In this way, the dish holders 2102 are universal and individually size-adjustable by the user, and the dish caddy 2100 of FIG. 20 can hold a wide variety of sizes and shapes of dishes 2118 as desired by the user at any given time.

In usage, the user first positions the dish holders 2102 as desired on the supporting rod 2108 by inserting the trunks 2116 of the dish holders 2102 into the desired holes 2108. The user then inserts a dish 2118 into the gap between an upper and lower dish holder 2102a, 2102b until the edge of the dish 2118 substantially abuts the side of the supporting rod 2108. The lower dish holder 2102b supports the base of the dish 2118 and prevents the dish 2118 from falling. Since the dish 2118 has a length that extends outward further than the length of the bottom dish holder 2102b, the weight of the dish 2118 causes the edge of the dish 2118 near the supporting rod 2108 to rotate upwards due to the force of gravity on the opposite edge of the dish 2118 pulling that edge downward. The dish 2118 is essentially attempting to rotate around the end of the bottom dish holder 2102b. However, the upper dish gripper 2102a prevents the inner edge of the dish 2118 from rotating upwards. The dish 2118 is thereby secured and held in position by pressure and friction forces exerted by both the upper and lower dish holders 2102a, 2102b. The weight of the dish 2118 and any food thereon increases the rotational force on the dish 2118 and helps the dish holders 2102 maintain a secure grip. Friction increasing means such as rubber coatings or pads may be applied to the surfaces of the dish holders 2102 during manufacturing in order to help facilitate a stable hold on the dish 2118.

As illustrated in FIG. 20, there are no holes 2112 on the supporting rod 2108 in the area of the hand grip 2110 thereby ensuring that the user can carry the dish caddy 2100 with the caddy 2100 is fully loaded without the user's hand(s) interfering with the dishes 2118 or food. Likewise, the top member 2106 of the dish caddy 2100 has a center hole 2120 allowing a bowl 534 such as illustrated in FIG. 7 to be mounted thereupon. The center supporting rod 2108 is not centered on the base and top members 2104, 2106 and is instead positioned near a side of the top and base members 2104, 2106. The user may therefore hold the dish caddy 2100 such that the caddy's supporting rod 2108 is adjacent the user's body on this side. Likewise, the plate holder holes 2112 on the supporting rod 2108 are directed such that the dish holders 2102 and dishes 2118 held thereon extend away from the user's body when the caddy 100 is held in this manner.

The plate holders 2102 gripping on both sides of the dish 2118 (e.g., on the top and the bottom of the dish) beneficially keeps the dishes 2118 from rotating and sliding off. Additionally, because the plate holders 2102 hold the dishes 2118 such that the dishes 2118 extend to the sides and/or front of the dish caddy 2100, the user can hold the back of the dish caddy 2100 against the user's body. Less effort and strength is required in the user's arm to hold the dish caddy 2100 in this manner thereby allowing only one-handed carrying of the dish caddy 2100. Likewise, keeping the caddy's supporting arm 2108 close to the user's body minimizes the space requirements and helps the server navigate around guests that may be standing between tables in the restaurant.

Figure 22:
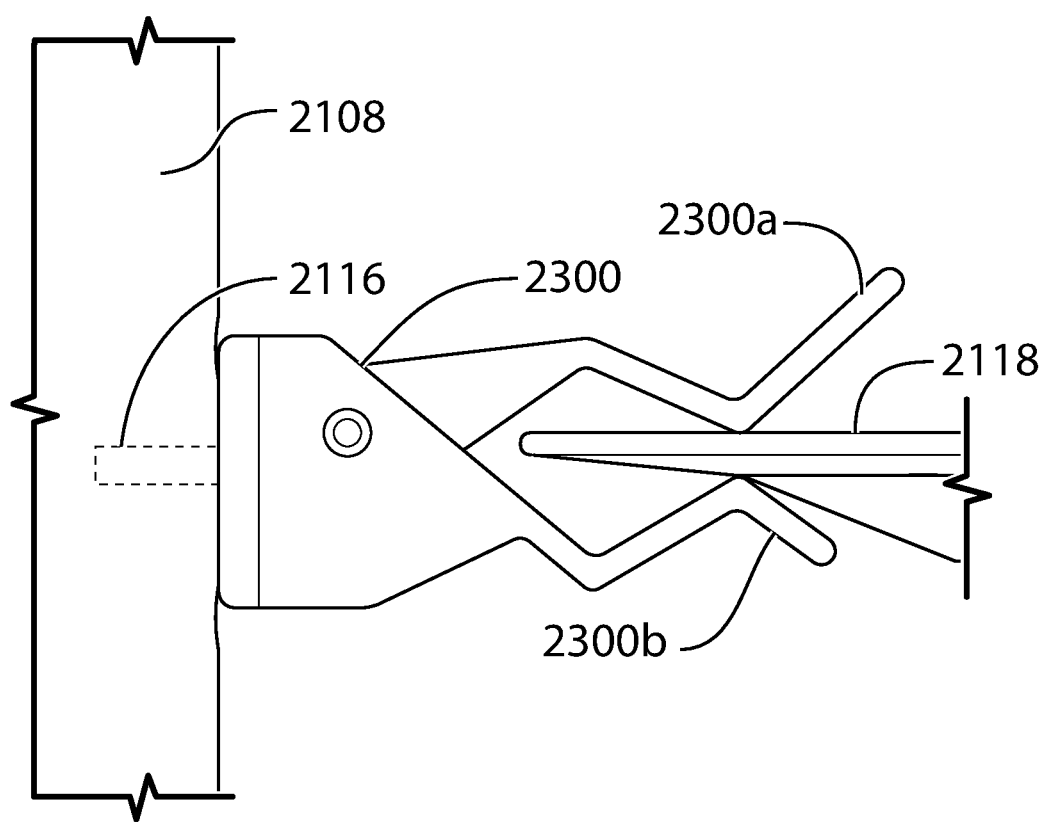
FIG. 22 illustrates a dish caddy with clamp-style dish holders according to an exemplary embodiment.
Figure 23:
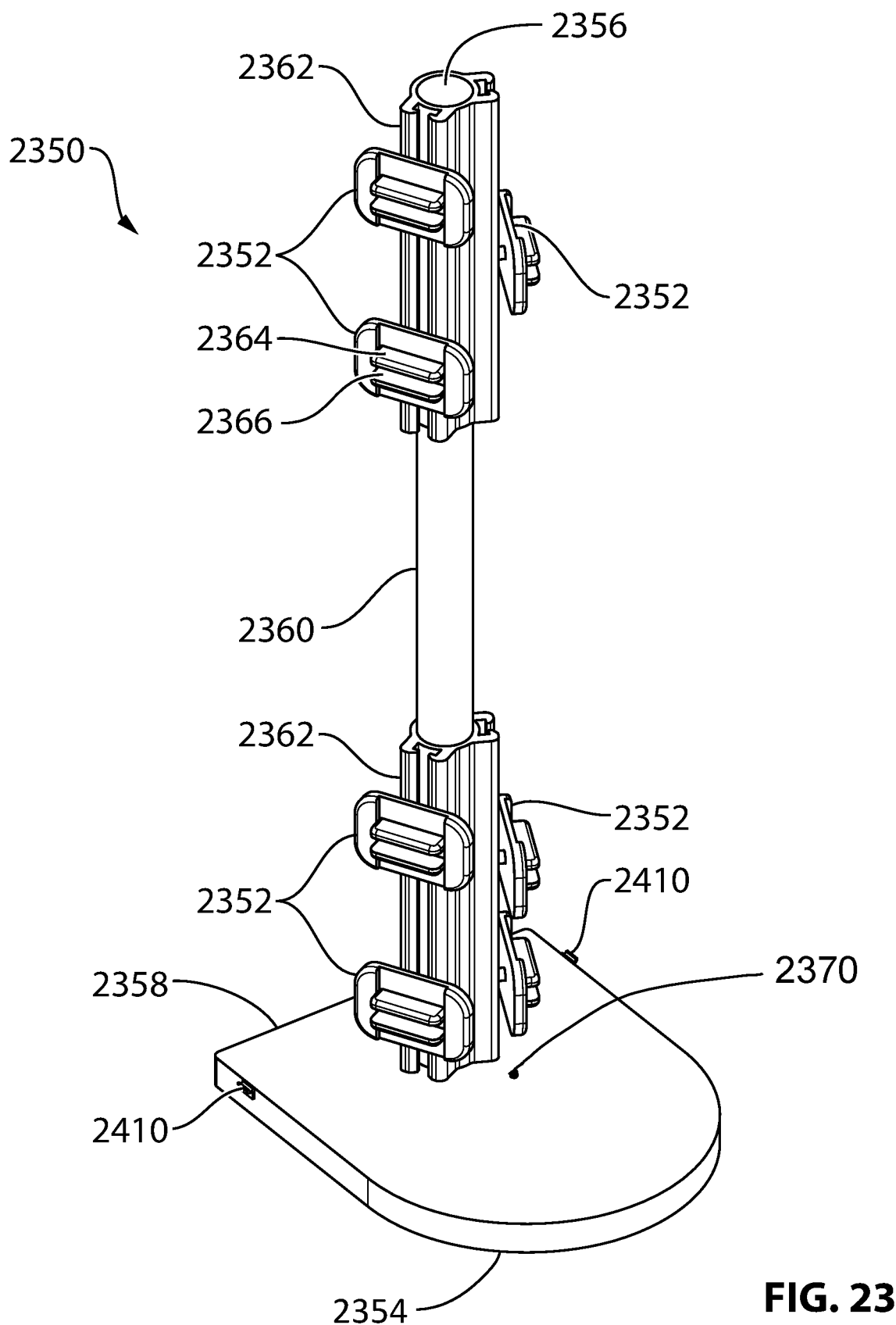
FIG. 23 illustrates a dish caddy with automatically adjusting dish holders according to an exemplary embodiment.

FIG. 22 illustrates a dish caddy with clamp-style dish holders 2300 according to an exemplary embodiment. Rather than Y-shaped dish holders 2102, in this embodiment, the dish holders 2300 are spring-loaded clamps 2300 that securely hold the edge of the dish 2118. The clamps 2300 may be adjustable in position with circular trunks 2116 that insert into holes 2114 of the supporting rod 2108 on the dish caddy 2100 of FIG. 20, or the clamps 2300 may be permanently attached to the supporting rod 2108 at fixed positions such as illustrated in FIG. 23. Again, each clamp 2300 includes an upper pressure pad 2302 and a lower pressure pad 2304. Any different size and shapes of upper and lower pressure pads 2302, 2304 may be utilized in different embodiments. For instance, the pressure pads 2302, 2304 may be flat and rectangular in other embodiments.

FIG. 23 illustrates a dish caddy 2350 with automatically adjusting dish holders 2352 according to an exemplary embodiment. As illustrated, the dish caddy 2350 includes a base member 2354 with a straight back edge 2358. A supporting rod 2356 is mounted on the base member 2354 and extends vertically upwards away from the base member 2354. To ensure stability of the dish caddy when deployed, the supporting rod 2356 is installed near the straight back edge 2358 of the base member 2354, away from the centre of gravity 2370 of the base member 2354. The centre of gravity 2370 of the base member 2354 is a point on the base member 2354 at which the base member 2354 would balance if suspended at that point. Mounting the supporting rod 2356 in this manner facilitates transporting the dish caddy by a user. A user may position the straight back edge 2358 of the base member 2354 against the user's body, while firmly gripping a hand grip 2360 on the supporting rod. As a result, the dish caddy can be transported with the supporting rod held close to the user's body.

The supporting rod 2356 includes a plurality of dish holders 2352 mounted directly to the supporting rod. Alternatively, each dish holder can be individually mounted on a dish holder track 2362 that is mounted to the supporting rod 2356. The dish holder track 2362 allows the vertical position of the dish holders 2352 on the supporting rod 2356 to be individually adjusted by the user.

Figure 37:
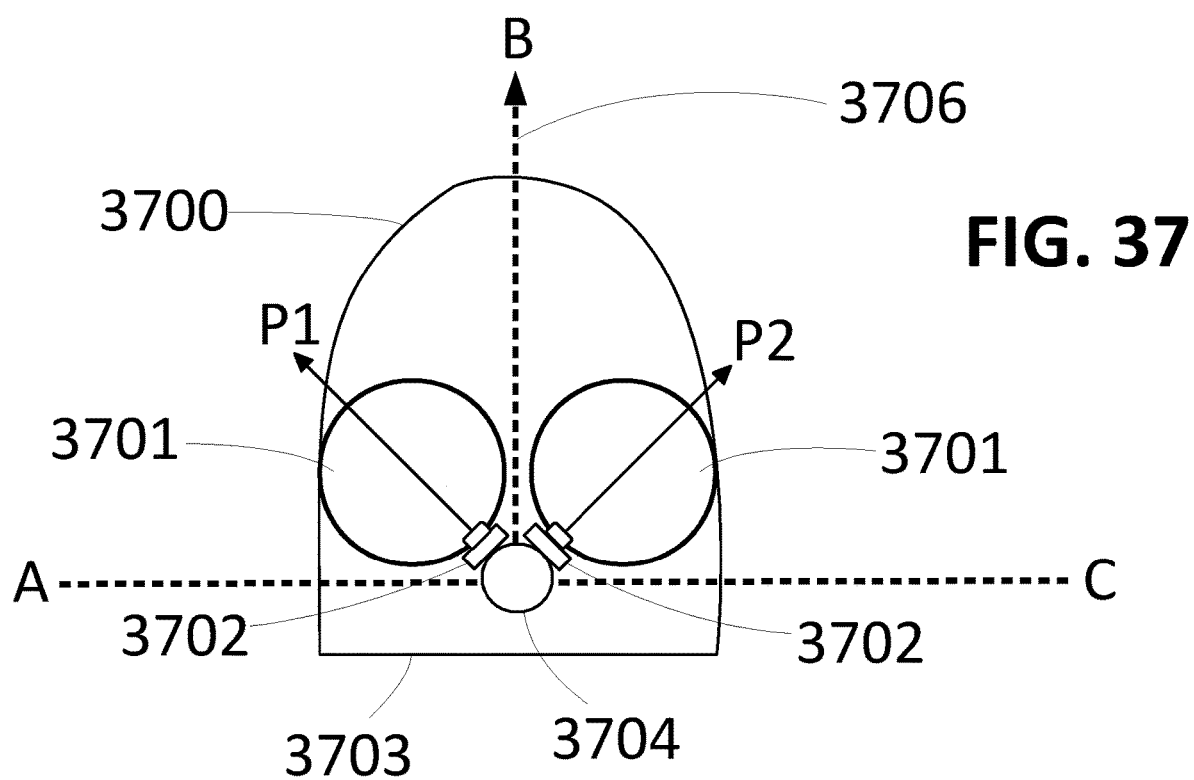
FIG. 37 illustrates a top-down view of the dish caddy assembly of FIG. 23, where a plurality of dishes is shown extending radially outwards from the supporting rod.

FIG. 37 shows a top-down view of the dish caddy of FIG. 23. As illustrated, each dish holder 3702 and a dish 3701 mounted therein extends radially outwards from the supporting rod 3704, where the radial direction for the two dish holders 3702 (dishes 3701) shown in the figure is represented by vectors P1 and P2. The dish holders 3702 and dishes 3701 are localized within a plane ABC. Each dish holder can undergo a rotation of up to one-hundred and eighty degree about the supporting rod, while still within the plane ABC, as result, the vectors P1 and P2 may not rotate below a horizontal line AC that bisects the supporting rod 3704 and runs parallel to the straight back edge 3703 of the base member 3700. The one-hundred and eighty-degree radius of rotation of the dish holders has a centre direction B at ninety-degrees. The centre direction B indicates a front direction 3706 of the dish caddy and is perpendicular to the straight back edge 3703 of the base member 3700.

Each dish holder 2352 in this embodiment is a clamp mechanism that is individually adjustable by the user. Each dish holder 2352 has a top pressure pad 2364 and a bottom pressure pad 2366. As illustrated, the size and shape of the pressure pads may be different or adjustable by the user. For instance, the pressure pads 2364, 2366 may include a hole into which the trunk of a Y-shaped dish holder similar to as illustrated in FIG. 21 may be inserted, such that the prongs 2114 of Y-shaped dish holder 2102 extend radially outward away from the supporting rod 2360. Likewise, the pads may be rectangular in shape or square pads. One or more or both of the top and bottom pressure pads may extend outwards away from the supporting rod in order to better grip and support dishes of different sizes. In general, the dish holders of both FIG. 20 and FIG. 23 can have any shape for the top and bottom pressure pads. White foam padding may be included on the top and bottom pressure pads to hold the plates snug. In a different structure, the position of the bottom pressure pad is fixed while the top pressure pad is moveable along the length of the supporting rod.

In addition, each of the dish holders 2352 may include a position guide between the top and bottom pressure pads through which each dish holder can be customized to receive a specific type of dish. The position guide comprises a plurality of buttons, each configurable for a specific type of dish. For instance, button A on the position guide may be configured for soup bowls, while buttons B and C are configured for dinner and dessert plates, respectively. Pushing one of the buttons activates a plurality of stoppers positioned at predetermined positions along the position guide. The stoppers trigger the distance between the top and bottom pressure pads to match the height of the dish type configured on the button that was pushed.

A different structure of FIG. 23 may include a storage compartment attached to an upper end of the supporting rod opposite the base member. The storage compartment can be used for storing condiments, napkins, and cutleries when the dish caddy is deployed for serving guests at a table. A plurality of lids can be included on the storage compartment to safeguard the contents of storage compartment while the dish caddy is being transported.

In the embodiment of FIG. 23, the distance between the top and bottom pressure pads 2364, 2366 of each dish holder is adjustable by the user. Each dish holder 2352 includes a spring that is internally positioned between the top and bottom pressure pads 2364, 2366 of the dish holder. The spring is neutrally biased to hold the top and bottom pressure pads 2364, 2366 at the fully opened position. However, a user may overcome the force of the spring in order to compress the spring and push the top and bottom pressure pads 2364, 2366 together in order to make contact with top and bottoms portions of a dish positioned therebetween. A gear system within the dish holder 2352 includes a locking tab that by default allows the gear system to move in one direction only to allow the top and bottom pressure pads 2364, 2366 to be moved together under force of the user. The locking tab prevents the spring force from pushing the pressure pads 2364, 2366 away from one another because the gear system will not move in that direction when the locking tab is engaged. A button is provided on the top or side of the dish holder 2352, and, when pressed, the button disengages the locking tab on the gear system. The force of the spring then pushes the top and bottom pressure pads 2364, 2366 apart from one another thereby opening the dish holder 2352 and allowing the dish to be removed. The speed that the top and bottom pressure pads 2364, 2366 open can be controlled by setting an appropriate gear ratio. Likewise, the force required for the user to move the top and bottom portions 2364, 2366 toward one another and close the dish holder 2352 can be controller by the spring's rigidity.

In usage, the dish caddy 2350 is initially positioned in the restaurant kitchen on a table top or other surface, and the dish holders 2352 are in the open position with the top and bottom pressure pads 2364, 2366 fully separated. The cook or another staff member positions a ready-to-serve plate or bowl between the top and bottom pads 2364, 2366 of a selected dish holder 2352 and then manually squeezes the top and bottom pressure pads 2364, 2366 toward one another until they securely grip the top and bottom edges of the dish. Each of the dish holders 2352 may be loaded in a similar manner. When ready to transport the meals to a table, a server lifts the dish caddy 2350 by holding the hand grip 2360 and carries the dish caddy 2350 to the guest's table. The server may then set the dish caddy 2350 on the table surface or on a separate base support 2400 (see FIG. 25) carried by the server in their other hand. The server grips a dish to serve with one hand and presses the unlock button on the corresponding dish holder 2350 with the other hand. The top and bottom pressure pads 2364, 2366 automatically open (i.e., separate from one another) in response to the button press and the dish is free and ready to be served. The process is repeated for each dish holder 2352 and all guests at the table are served. The server then returns the empty dish caddy 2350 to the kitchen for loading with another table's food.

Figure 24:
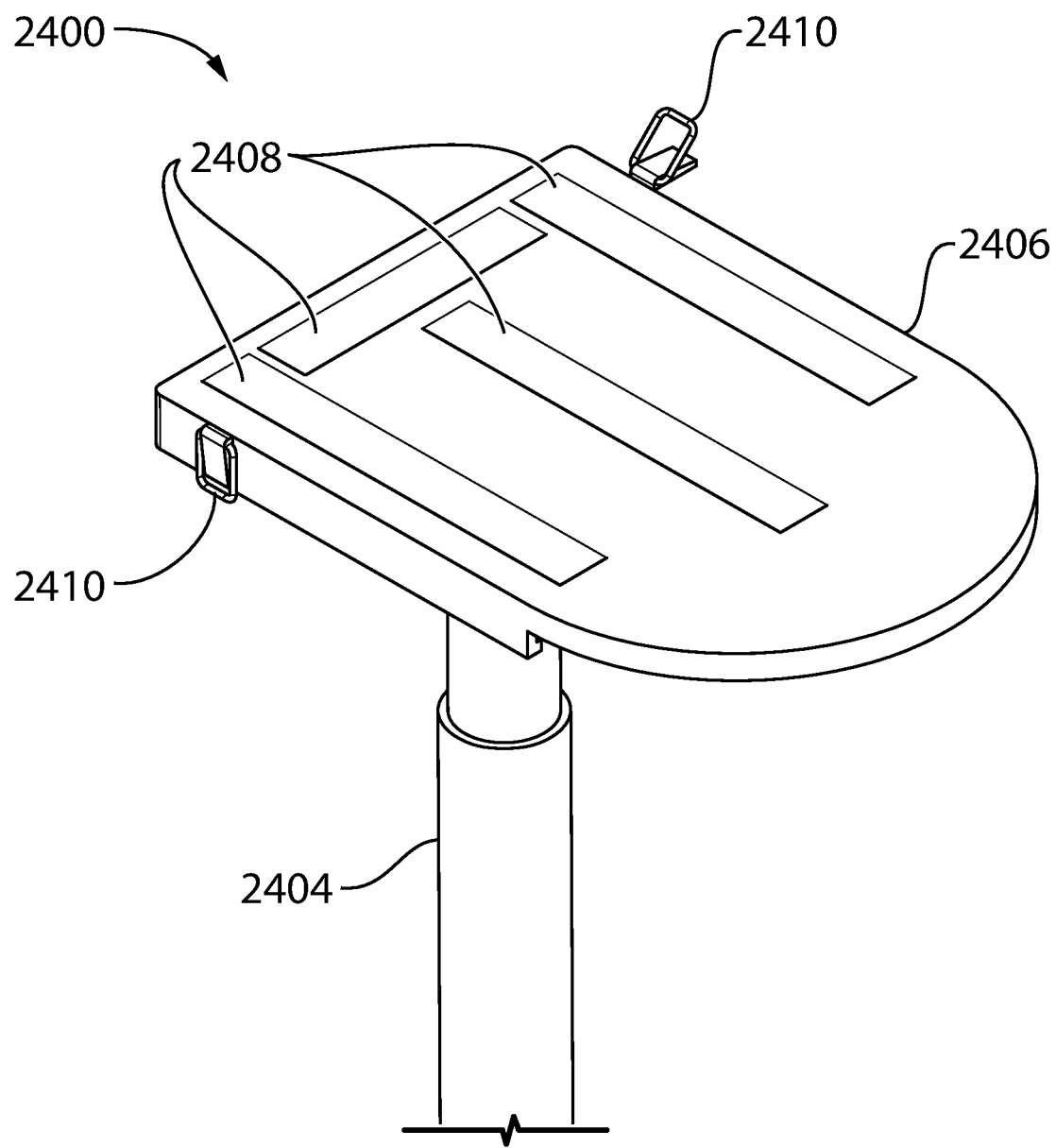
FIG. 24 illustrates a perspective view of a base support stand for the dish caddy of FIG. 23 according to an exemplary embodiment.

FIG. 24 illustrates a perspective view of a base support stand 2400 for the dish caddy 2350 of FIG. 23 according to an exemplary embodiment. The base support 2400 includes a circular base member 2402 with a supporting rod 2404 mounted in the center and supporting a top member 2406. The upper surface of the top member 2406 includes a plurality of magnets 2408 and these magnets 2408 attract to a corresponding plurality of magnets mounted on an underside of the base member 2354 of the dish caddy 2350. The magnets 2408 are primarily to facilitate the positioning of the dish caddy 2350 on the base support 2400.

Figure 25:
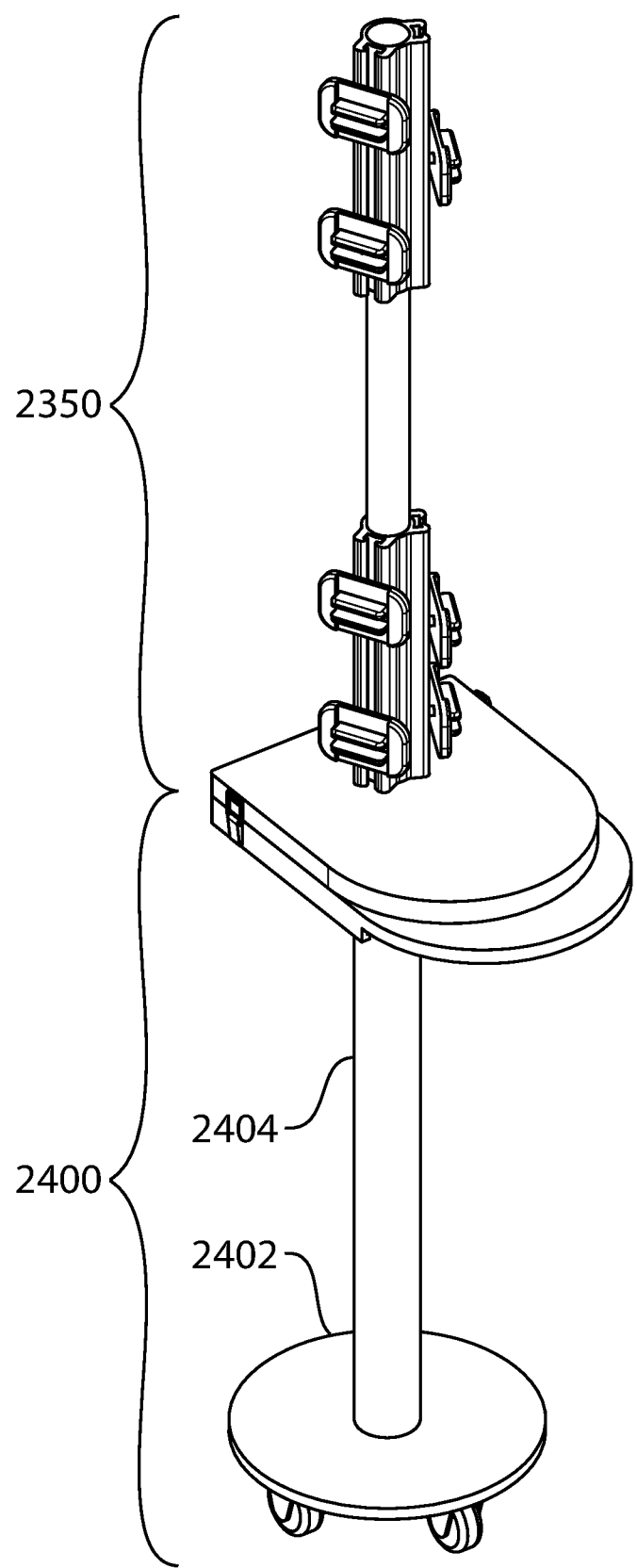
FIG. 25 illustrates a perspective view of the dish caddy of FIG. 23 mounted on the base support of FIG. 25.

FIG. 25 illustrates a perspective view of the dish caddy 2350 of FIG. 23 mounted on the base support 2400 of FIG. 25. Side latches 2410 are provided to securing the dish caddy 2350 to the top member 2406 of the base support 2400. The underside of the base member 2402 of the base support 2400 includes a caster wheels 2412 allowing both the base support 2400 and the dish caddy 2350 mounted thereupon to be moved by the user without needing to lift the full weight.

Figure 26:
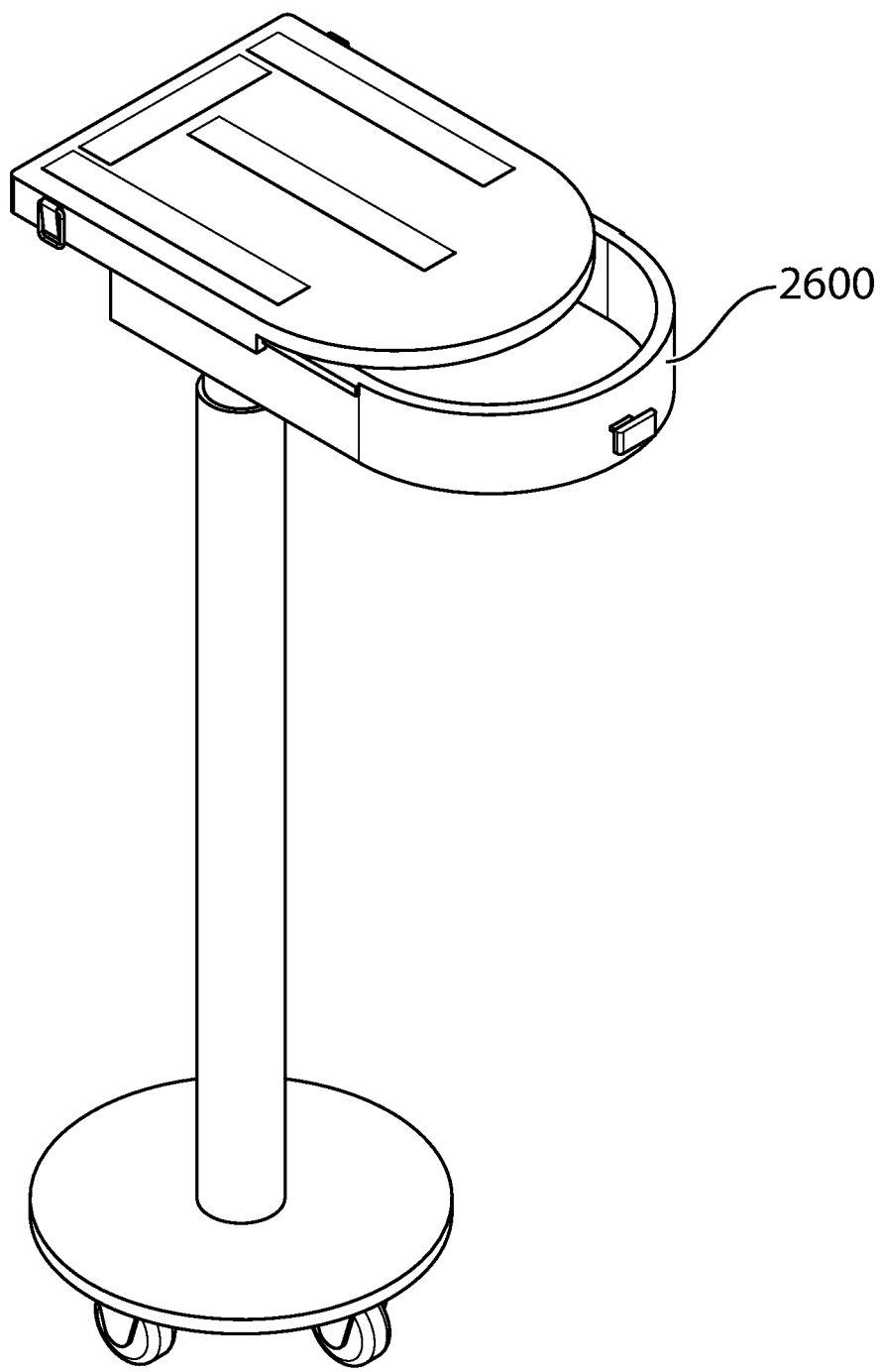
FIG. 26 illustrates a drawer integrated on an underside of the top member of the base support.

FIG. 26 illustrates a drawer 2600 integrated on an underside of the top member of the base support. Tracks running lengthwise front to back on the underside of the top member engage with tracks on the side of the drawer. In this way, the drawer can slide back and forth to open and close under control of the user. The drawer 2600 may be beneficial to hold condiments or other supplies that may be needed at the table when serving dishes.

Figure 27:
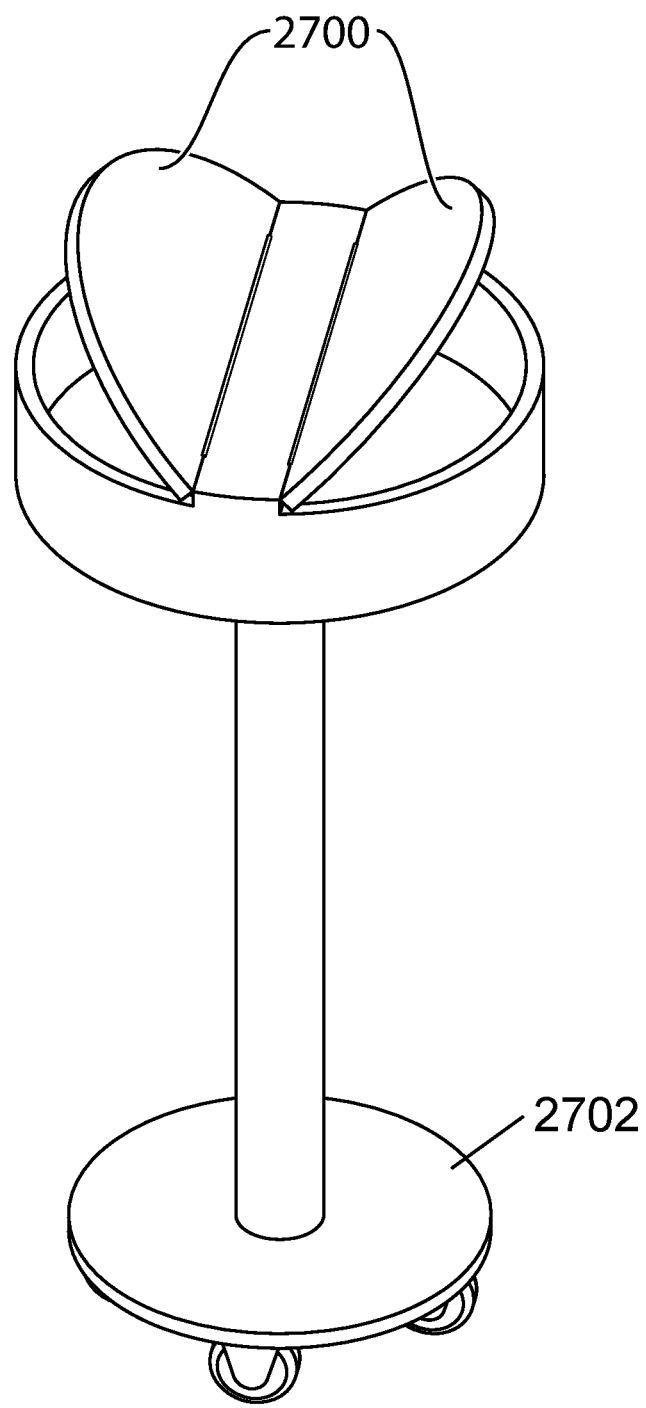
FIG. 27 illustrates a perspective view of an alterative base support design that includes flip up lids to access a storage cavity.

FIG. 27 illustrates a perspective view of an alterative base support design that includes flip up lids 2700 to access a storage cavity. Two top members are provided in this embodiment and are hinged along a middle section such that each top member can be rotated upwards thereby providing entry to a cavity underneath. The cavity is formed by a frame build under the top members. In yet another embodiment of a flip up lid design, the storage cavity and flip up lids may be mounted on the base member 2702, which advantageously allows the storage cavity to be accessed even when a caddy is mounted on the top of the base support.

Figure 28:
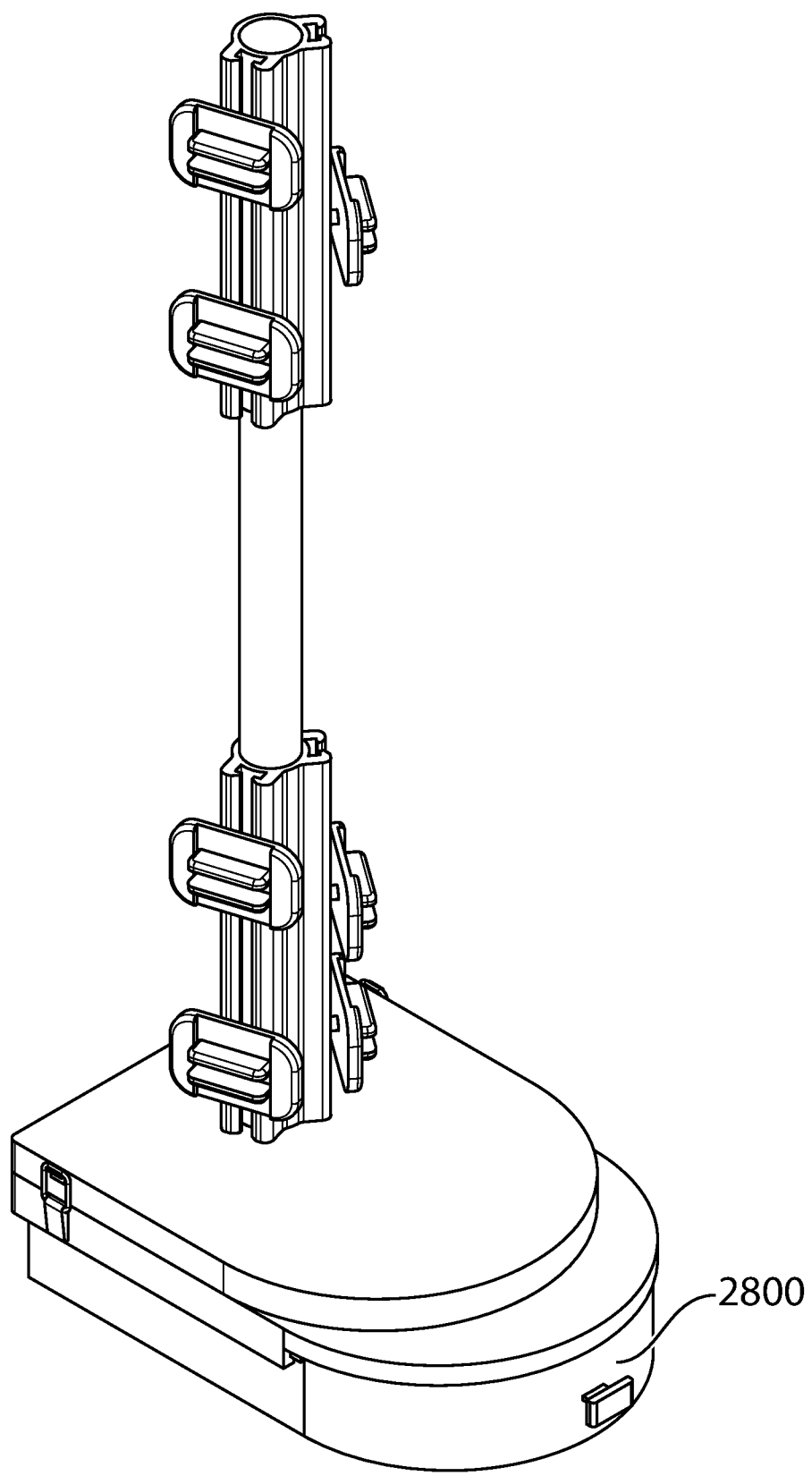
FIG. 28 illustrates a perspective view of a dish caddy with automatically adjusting dish holders and an integrated drawer according to an exemplary embodiment.

FIG. 28 illustrates a perspective view of a dish caddy with automatically adjusting dish holders and an integrated drawer 2800 according to an exemplary embodiment. In some embodiments, tracks are provided on the underside of the base member and engage with tracks on the drawer similar to as described above when the drawer is provided on the underside of the top member of the base support of FIG. 27. In other embodiments, a full frame may be provided underneath the base member of the dish caddy and the drawer may enter and exit the frame through an opening.

Figure 29:
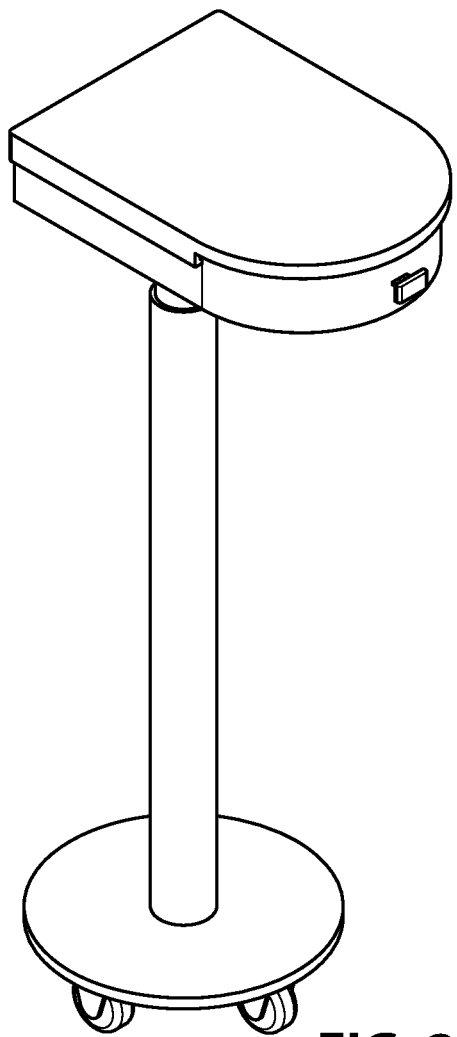
FIG. 29 illustrates a perspective front-view of a base support with integrated drawer and adjustable height according to an exemplary embodiment.

FIG. 29 illustrates a perspective front-view of a base support with integrated drawer and adjustable height according to an exemplary embodiment. As illustrated the base support of FIG. 29 is similar to that of FIG. 26 except now the supporting rod is telescoping and can be adjusted to a plurality of heights. The supporting rod is shown fully extended to provide maximum height to a dish caddy supported thereon.

Figure 30:
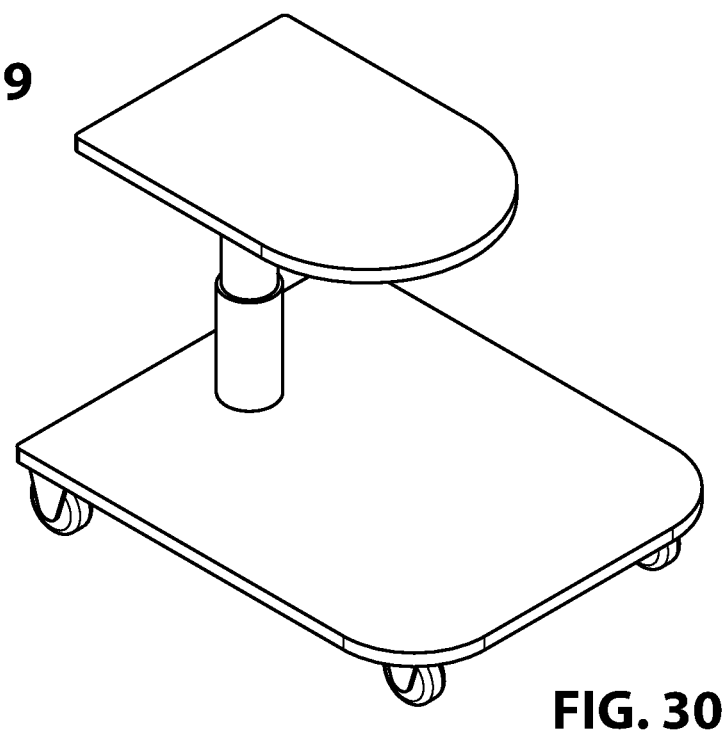
FIG. 30 illustrates a perspective front-view of another base support with integrated with adjustable height according to an exemplary embodiment.

FIG. 30 illustrates a perspective front-view of another base support with integrated with adjustable height according to an exemplary embodiment. In this example, the base member is much wider than the top member to provide greater stability. The supporting rod again is telescoping and is shown while being adjusted to the minimum height. Having adjustable heights on the base supports may be beneficial to accommodate utilizing the base with a different sized dish caddies. For instance, an eighteen-plate dish caddy may require less height extension that a six-plate dish caddy.

Figure 31:
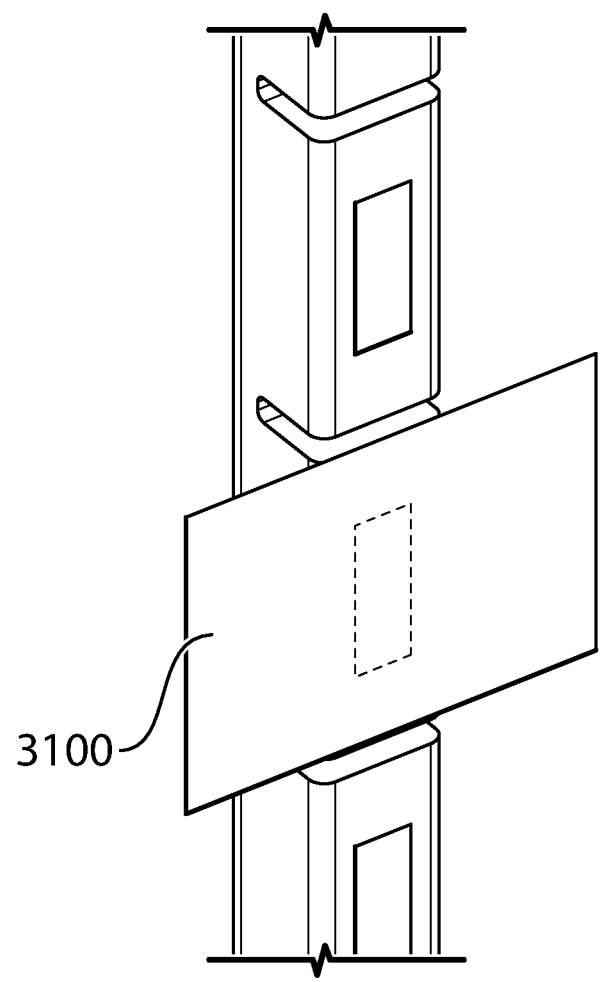
FIG. 31 illustrates a table marker on the dish caddy in order to indicate details of meals according to an exemplary embodiment.

FIG. 31 illustrates a table marker 3100 on the dish caddy in order to indicate details of meals according to an exemplary embodiment. In FIG. 31, the table marker is a magnetic label attached to magnets mounted on the caddy. A magnetic table marker 3100 may also be directly attached to metal portions of the caddy such as the supporting rods when the supporting rods are made of ferromagnetic material.

In other embodiments, the table marker 3100 may extend outwards from a supporting rod. The table marker includes a magnet that attracts to and affixes the table marker to the center supporting rod. A rigid wire extends outwards from the magnet and has a label surface attached to an end of the wire. The label surface may be a dry-erase white board area allowing a user to write indications of the table or even meal specific details. For instance, when a dish caddy is utilized to carry multiple tables' meals at a single time, a table marker may be used to indicate that the dishes below the marker are for a "Table 1" while the dishes above the marker are for "Table 2". Likewise, meal specific details may include an indication of "rare" or "well done" to differential between otherwise similar looking dishes.

In some embodiments, doors, windows, and panels around the outside of the dish caddy are transparent material such as Plexiglas® to allow visibility into the dish caddy. Customers seated at other tables may see the food within the dish caddy and may ask their servers for a similar dish. Especially for deserts, keeping the food visible to other guests within the dish caddy during table delivery and serving is beneficial. Dish caddies disclosed herein facilitate food presentation. Clients can see dishes such as deserts and take one right away. Dish caddies disclosed herein compliment menus and verbal description by showing off the food directly. However, having transparent doors and windows is not a requirement and in other embodiments, the outside of the dish caddy may be opaque. Thermal wraps may also be provided and wrapped around with or without transparent materials such as Plexiglass® to keep food warm.

Figure 32:
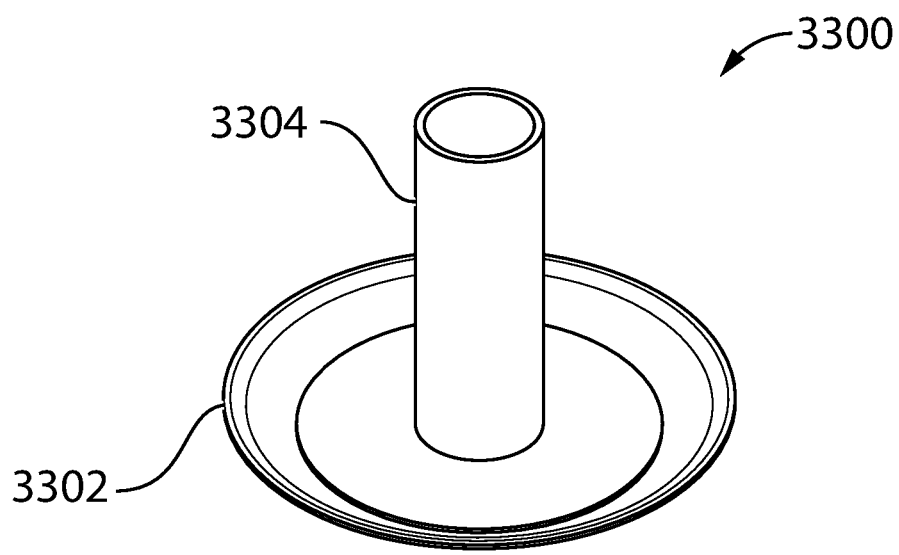
FIG. 32 illustrates a drink clearing tray according to an exemplary embodiment.

FIG. 32 illustrates a drink clearing tray according to an exemplary embodiment. The drink clearing tray includes a tray 3302 with a cylinder 3304 in the center of the tray 3302. In some embodiments, the cylinder 3304 is permanently affixed to the tray 3302 in order to prevent the cylinder 3304 from tipping over during usage. However, in other embodiments, the cylinder 3304 may be semi-attached to the tray 3302 such as using a securing post, magnetic attachments, or clips thereby allowing the cylinder 3304 to easily be removed from the center of the tray 3302 when desired.

In usage, the server or cleaning staff pour unused drinks into the cylinder 3304 and then stack the empty glasses around the cylinder 3304 on the tray 3302. By pouring the liquids into the center of the tray 3302, the glasses may be evenly distributed by the user to balance the weight on the tray 3302. Especially when the glasses are all the same design, it is much easier for the server to quickly distribute the weight on the tray 3302 in an even manner when the glasses are empty. Facilitating the server to quickly make a symmetrical and balanced arrangement on the tray 3302 helps prevent accidental drops and wasted time doing cleanups. Furthermore, if an empty glass is dropped, the cleanup is far easier than if the glass is full because there are no liquids to be absorbed prior to sweeping the broken glass, thus saving time. Also, no mop bucket or "wet floor" sign must be transported from the kitchen to the breakage area, thus saving physical effort, time and risk of injury to guests/employees FIGS. 33 to 36 illustrate a method of converting a regular serving tray 3302 into the drink clearing tray 3300 of FIG. 32 according to an exemplary embodiment. The described steps are not restricted to the exact order shown, and, in other configurations, shown steps may be omitted or other intermediate steps added. Restaurants may typically already have a plurality of serving trays 3302 and may wish to convert some of them into the drink clearing tray 3300 of FIG. 32. In an exemplary embodiment, a serving-tray-to-drink-clearing-tray conversion kit contains the following materials:

a cylinder 3304;
an upper member 3306;
a lower member 3308;
a screw 3310; and
a cylinder securing post 3312.

Figure 33:
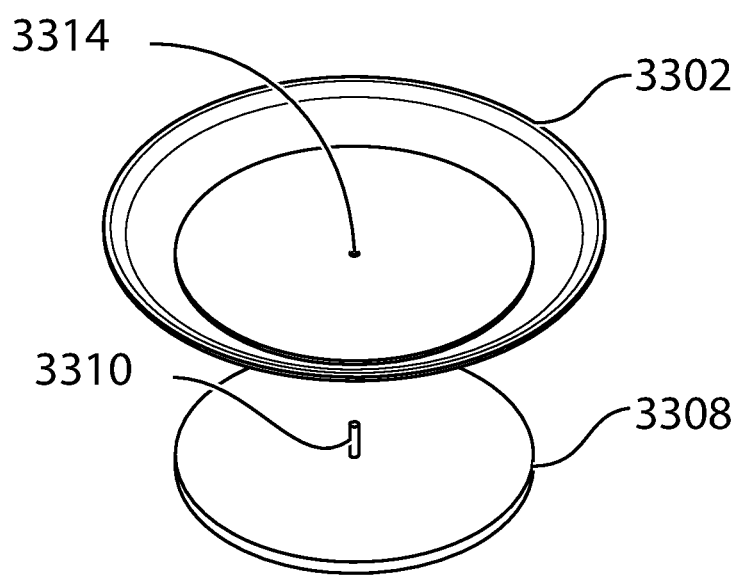
FIG. 33 illustrates a perspective view of a first step in a process of converting a regular serving tray into a drink clearing tray according to an exemplary embodiment.

FIG. 33 illustrates a perspective view of a first step in a process of converting a regular serving tray 3302 into a drink clearing tray 3300 according to an exemplary embodiment. A hole 3314 is drilled in a center position of the serving tray 3302 and the lower member 3308 is positioned under the serving tray 3302 with the screw 3310 passing through a hole 3314 in the center of the lower member 3308 and the serving tray 3302.

FIG. 34 illustrates a perspective view of a second step in a process of converting a regular serving tray 3302 into a drink clearing tray 3300 according to an exemplary embodiment. The upper member 3306 is positioned on the upper side of the tray 3302 with the screw 3310 passing through the hole 3314 in the upper member 3306. With the serving tray 3302 sandwiched between the upper and lower members 3306, 3308, the user screws the cylinder securing post 3312 onto the screw 3310. The cylinder securing post 3312 has a threaded hole on one end with hole size and threads matching the screw 3310.

FIG. 35 illustrates a bottom view of the cylinder 3304 showing that the cylinder 3004 is sealed on the bottom and includes a post mounting cavity 3316 for accepting the cylinder securing post 3312. The cavity 3316 does not pass through the base of the cylinder 3304 so that liquids held within the cylinder 3304 cannot flow out the cavity 3314.

FIG. 36 illustrates a perspective view of a third step in a process of converting a regular serving tray into a drink clearing tray according to an exemplary embodiment. The user places the cylinder 3304 onto the cylinder securing post 3312 with the post 3312 extending into the cavity 3316 in the bottom of the cylinder 3304. The cylinder 3304 will not tip over because the cylinder securing post 3312 holds the cylinder 3304 in an upright orientation extending perpendicular to the upper surface of the serving tray 3302. However, the cylinder 3304 can easily be removed by the user simply lifting the cylinder 3304 vertically off the securing post 3312 such as may be desired in order to dispose of unused drinks or other liquids held within the cylinder 3304.

Figure 38:
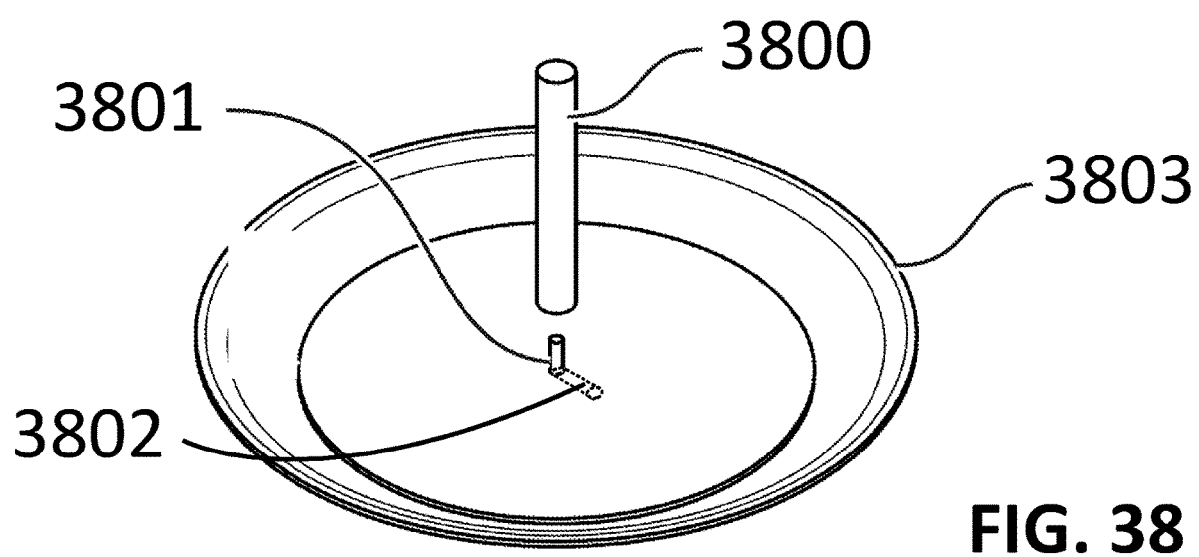
FIG. 38 illustrates a dish serving tray that can be adapted into a drink clearing tray according to an exemplary embodiment.

In a different embodiment, the lower member 3308 and dish serving tray 3302 of FIG. 33 may be built into a single unit as shown in FIG. 38. As illustrated, the post 3801 is configurable for one of two positions. The first is a stored position 3802 where the post is laid parallel to the base of the dish serving tray 3803, while the second is a deployed position where the post extends vertically upwards. In the deployed position, the dish serving tray may be converted into a drink clearing tray by a user. This is achievable by attaching the cylinder securing post 3800 onto the post 3801 and placing the cylinder 3304 of FIG. 36 onto the cylinder securing post 3800.

Figure 39:
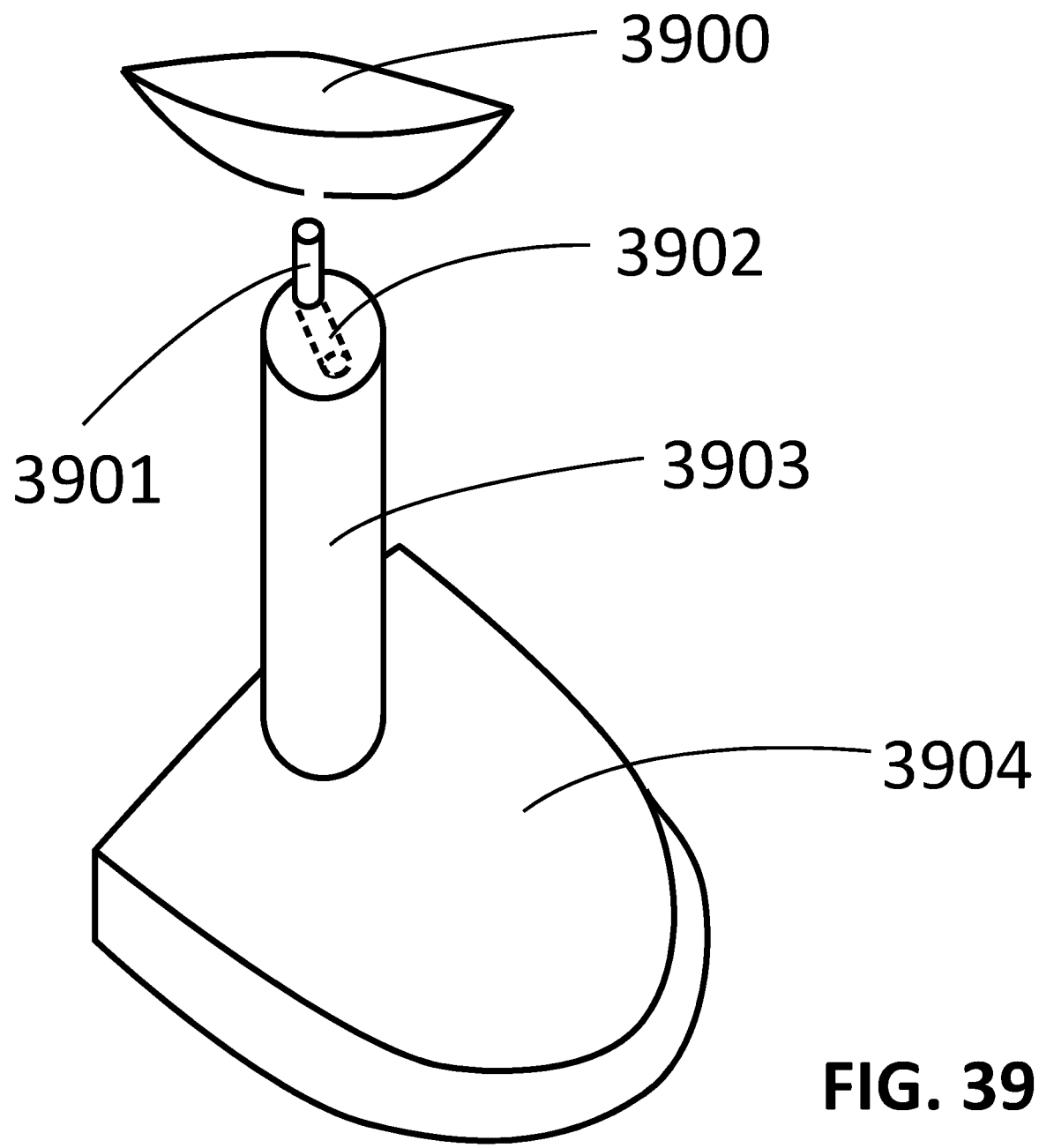
FIG. 39 illustrates a dish caddy structure where the upper end of the supporting rod has been configured to receive a cleanup bowl/drink tray with a hole in it according to an exemplary embodiment.

FIG. 39 illustrates a similar technique applied to the supporting rod 3903 of a dish caddy system. The vertical post 3901 is affixed to the upper end of the supporting rod 3903. The vertical post 3901 is configurable for one of two position—either a stored position or a deployed position. In the deployed position, the vertical post extends vertically upwards. In this position, a user may secure a cleanup bowl or a drink tray (with a hole its center) on the vertical post.

Exemplary advantages of embodiments of the invention include increasing efficiency by having fewer employees required to serve large groups, reducing accidents and associated food and time waste, and enhancing the dining experience by serving all members of a party at the same time. The vertical construction combined with the light weight of dish caddies disclosed herein allows for more stability and a large number of dishes to be transported by a single employee. Aesthetically speaking, dish caddies disclosed herein may also be considered as a means of displaying the dishes to other patrons while they are being delivered to their respective table. Dish caddies disclosed herein also allow for the transport up and down stairs when needed, something which is very difficult to do with existing food trolley designs.

Although the invention has been described in connection with preferred embodiments, it should be understood that various modifications, additions and alterations may be made to the invention by one skilled in the art. For example, although the front locking windows of FIG. 5 operate to hold the dishes in position, a locking bar on a pivot arm may be utilized similar to as shown in FIG. 1. Likewise, the hinged locking windows may be utilized on the six-plate dish caddy of FIG. 1 in other embodiments. Any combination of locking bars, pivot arms, hinged doors, hinged windows, plate edge grippers, locking latches, friction pads, dish holders, upper and lower pressure pads, etc. can be utilized to help ensure that dishes stored in the dish caddy remain stable within or otherwise attached to the dish caddy during transport.

Although the back window in FIG. 9 is illustrated and described to extend only up a portion of the vertical height of the dish caddy in order to avoid blocking the hand grip, other embodiments are also possible. For instance, the back window may extend the full height of the dish caddy in other embodiments. In order to facilitate access to the hand grip, the back window may have an opening through which the user's hand passes. Alternatively, the center supporting rod may be a vertical frame in a middle part of the back window such that the transparent material extends outward on either side of the supporting rod. The supporting rod may be thicker than the transparent material in the forward, inner-facing side thereby allowing the plurality of notches to be carved into the supporting rod and used in a similar manner as described above to accept an edge of a plate or other dish. In some embodiments, the dish caddy resembles a clear (e.g., Plexiglass®) tube with hinged doors allowing access to dish holders within such as notches, latches, and/or clamps. Back windows and/or other sidewall doors, windows, panels may also be incorporated on the six-plate dish caddy in a similar manner. Any of the dish caddies disclosed herein may be fully or partially enclosed to help preserve heat and cleanliness in other embodiments.

Although specific numbers of plates are illustrated in the above embodiments such as with the six-plate, twelve-plate, and eighteen-plate dish caddies, it is to be understood that these plate numbers are for illustration purposes only and other plate numbers may be incorporated on otherwise structurally similar dish caddies in other embodiments. Different caddies may be stackable one on top of the other and may be provided with separate base supports, which may have adjustable heights facilitating usage with different sized dish caddies and tables. The base supports and stackable alignment protrusions may be compatible across the suite of caddies and bases to allow interchanging and combination usage.

Although the present disclosure has focused on plates and bowls, the term "dish" as utilized herein is intended to cover any type of dish. The description of a specific dish such as a plate or bowl is for example only. It is possible that bowls or other types of dishes can be held in a position where the above description indicates that a plate or particular type of dish is being held. In general, the various dish caddies can be utilized to hold any type of dish including plates, bowls, and even glasses or other table items of a variety of sizes and shapes. Different sizes of notches and groves and dish holder prongs, clamps, and pressure pads may be utilized as desired in application specific embodiments.

Glasses may be transported by a glass clearing accessory tray available for any of the above caddy embodiments. The glass clearing trays are made to work in combination with the tray depicted in FIG. 32 and are designed to clear two to three times the amount of glasses a server would usually clear in a single trip. For instance, the embodiments described in FIG. 5 and FIG. 13 could have three levels of glass clearing trays. One lower tray, one middle tray and a top tray matching the design in tray 3300 of FIG. 32.

The outward extending dish holders of FIG. 20 and FIG. 23 can be fixed in position or adjustable in position on the supporting rod. Likewise, other types of dish holders can be employed extending from a supporting rod. Examples of dish holders include rigid wires and beams, clamps, pressure pads, utility hooks, grippers, shelves, notches, slots, etc. Each of these dish holders 2102, 2352 may be user removable such as for cleaning or in case of defective parts, and/or may have adjustable sizes to accommodate different dish sizes (e.g., bowls v. plates).

The various dish caddies may also be collapsible and foldable to make storage easier. For example, the dish caddy can be collapsible for hanging on a wall for storage when not in use. In yet another option, electric heat plates may be provided on either or both of the top and base members to keep food hot while waiting. Heat elements may be included at the top and/or bottom of the caddy; alternatively, heating elements may also run vertically along the supporting beams.

In the model featured in FIG. 20, in some embodiments, the "Y" shaped removable parts 2102 are attached to a string or cord of some sort to avoid the parts 2102 being lost during their use or when adjusting for plate sizes (falling to the ground, loss, etc.). Likewise, any of the above caddy designs can be changed from a flat base to a "tripod" style base or vice versa. The tripod style base may fold up and be stored within a hollow center of the supporting rod. A dropping\retractable stand may be stored inside the middle supporting rod instead of a flat base and may removable and insertable by the user. The operation may be similar to compact umbrellas that include a button that ejects the whole mechanism. In other words, the caddy may include an "eject button" on the main holding bar near one of the handgrips and instead of an umbrella releasing, the tripod style base is ejected out of the bottom of the telescoping supporting rod to form a tripod base.

In FIG. 1, the rotatable arm 102 does not need tabs 128 and roller latches 126 and, in other embodiments, the arm 102 is self locking at multiple degrees using a self-contained mechanical "clicking" mechanism instead. The end purpose remains of securing the plates 112 remains the same and the swivel movement remains identical; however, the arm 102 locks somewhat differently in other embodiments.

In another option to secure plates during transport utilizing caddies similar to those illustrated in FIGS. 1, 5 and 13. Rather than having any kind of "swivel" arm or Plexiglass doors, another way to secure the plates by providing lateral supporting bars in these models involves rotatable supporting rods 1310a and 1310b. By swiveling slightly inwards (with a "clicking" stopper mechanism to lock), the support bars 1310a, 1310b can be rotated by a user into a "locked position" to apply additional pressure on the plates and therefore keep them in place. Likewise, for removal, a user can rotate supporting rods 1310a and 1310b into an "unlocked position" that allows the plates to be removed from the notches 1302.

Metal top members and/or magnets provided on the top member of the dish caddies can be used both to facilitate alignment when stacking and/or to hold decorative signs, logos, promotions, menus, etc. Although no top member is illustrated in the example of caddy 2350 in FIG. 23, in another embodiment, the caddy 2350 can be modified to include a top member. Likewise, embodiments shown above that include top members can also have their top members omitted to reduce weight requirements. For instance, in FIG. 1, instead of a full top member 106, a circular frame may interconnect and provide support to the supporting rods 108.

Any of the above embodiments may include Velcro® or magnetic dry-erase markers and/or marker attachments to write notes related to specific dishes held within the dish caddy. Examples of notes that may be beneficial to write including "medium"/"rare"/or "well done" on a steak. White board material may be provided for each dish level in a multi level dish caddy. Dryboard pens and/or pen holders may be included on the outside of the caddy support rods to ensure the server always has a pen available.

Any desired materials may be utilized to construct the dish caddies including light weight plastic, metals, and/or wood. In some embodiments, the base/top members, supporting rods, and/or dish holders are light weight aluminum while the transparent windows, doors, and/or sidewall panels are transparent plexiglass.

Functions of single modules may be separated into multiple units, or the functions of multiple modules may be combined into a single unit. All combinations and permutations of the above described features and embodiments may be utilized in conjunction with the invention.

What is claimed is:

1. A dish caddy for transporting food to a restaurant table, the dish caddy comprising:
a base member;
a supporting rod mounted to the base member and extending upwards from the base member in a vertical direction;
a plurality of dish holders mounted to the supporting rod, the dish holders respectively extending away from the supporting rod in a plurality of different radial directions and at a plurality of different levels along the vertical direction of the supporting rod; and
a hand grip on the supporting rod, the hand grip positioned between a first level and a second level along the vertical direction of the supporting rod and having no dish holders extending from the supporting rod between the first level and the second level;
wherein the different radial directions of all the dish holders extending from the supporting rod are within a range of one-hundred and eighty degrees around the supporting rod and the dish caddy as a whole has no dish holders extending from the supporting rod outside the range of one-hundred and eighty degrees;
the range of one-hundred and eighty degrees around the supporting rod has a center direction at ninety degrees corresponding to a front direction of the dish caddy;
each of the dish holders includes a top pressure pad and a bottom pressure pad for supporting a respective dish placed into the dish holder by a user;
the bottom pressure pad of each of the dish holders extends away from the supporting rod a further distance than the top pressure pad;
the bottom pressure pad of each of the dish holders is a first surface for supporting a base of the respective dish supported thereon and including a friction increasing means for facilitating a stable hold on the respective dish;
the top pressure pad of each of the dish holders is a second surface blocking an edge of the respective dish from moving upward in the vertical direction to thereby prevent the respective dish from rotating around the bottom pressure pad and falling off the bottom pressure pad;
the top pressure pad and the bottom pressure pad of each of the dish holders, in combination with gravity acting on the respective dish, thereby collectively hold the respective dish in a fixed position relative to the supporting rod when a user lifts and carries the dish caddy from the hand grip, the fixed position of each respective dish being within a plane that is substantially perpendicular to the supporting rod and parallel to the base member; and
a respective radial direction of each of the dish holders corresponds to a vector extending from the supporting rod less than ninety-degrees from the center direction such that the respective dish supported by each of the dish holders are angled away from a back side of the dish caddy, whereby the user can thereby carry the dish caddy fully loaded with dishes and food to the restaurant table from the back side of the dish caddy with the supporting rod held adjacent the user's body.

2. The dish caddy of claim 1, wherein:
the supporting rod is coupled to the base member at a location away from a center of gravity of the base member; and
the center direction extends from the supporting rod towards the center of gravity of the base member.

3. The dish caddy of claim 2, wherein the base member has a straight back edge perpendicular to the front direction.

4. The dish caddy of claim 1, wherein:
at least one of the top pressure pad and the bottom pressure pad is moveable such that a distance between the top pressure pad and the bottom pressure pad is adjustable.

5. The dish caddy of claim 1, wherein the bottom pressure pad is mounted to the supporting rod with a fixed position and the top pressure pad is moveably coupled to the supporting rod.

6. The dish caddy of claim 1, wherein each of the dish holders includes a Y-shaped plate holder on the bottom pressure pad, the Y-shaped plate holder having two prongs extending radially outward away from the supporting rod.

7. The dish caddy of claim 1, wherein each of the dish holders is rotatable around the supporting rod such that the respective radial direction from the supporting rod is changeable within the range of one-hundred and eighty degrees around the supporting rod.

8. The dish caddy of claim 1, further comprising:
a dish holder track attached to the supporting rod;
wherein at least one of the plurality of dish holders is mounted to the dish holder track and moveable along the dish holder track such that a vertical position of the dish holder along the supporting rod is changeable.

9. The dish caddy of claim 1, wherein the supporting rod is a telescoping rod.

10. The dish caddy of claim 1, wherein the base member has a plurality of side latches for securing the dish caddy to an external surface.

11. The dish caddy of claim 1, further comprising a plurality of wheels coupled to the base member for facilitating transporting the dish caddy.

12. The dish caddy of claim 1, further comprising a storage compartment at an upper end of the supporting rod opposite the base member.

13. The dish caddy of claim 1, further comprising:
a vertical post affixed to an upper end of the supporting rod;
wherein the vertical post receives an item through a hole in the item, the vertical post configurable for a first, stored position such that the vertical post lays parallel to the upper end of the supporting rod, and the vertical post further configurable for a second, deployed position such that the vertical post is upright.

14. The dish caddy of claim 13, wherein the item is selected from a group consisting of a cleanup bowl and a drink tray.

15. The dish caddy of claim 1, further comprising one or more label surfaces for jotting down meal specific details.

16. The dish caddy of claim 6, wherein each Y-shaped plate holder is removable from the bottom pressure pad.

17. The dish caddy of claim 1, further comprising:
one or more first prongs extending from a first one of the dish holders; and
one or more second prongs extending from a second one of the dish holders;
wherein the one or more second prongs are a different shape than the one or more first prongs.

18. The dish caddy of claim 1, further comprising:
one or more first prongs extending from a first one of the dish holders; and
one or more second prongs extending from a second one of the dish holders;
wherein the one or more second prongs are a different size than the one or more first prongs.

19. The dish caddy of claim 1, being collapsible for storage.

20. A method of transporting food to the restaurant table utilizing the dish caddy of claim 1, the method comprising:
positioning the dish caddy on an initial surface within a kitchen;
inserting a first dish loaded with food between the bottom pressure pad and the top pressure pad of an available dish holder such that a first edge of the first dish substantially abuts a side of the supporting rod;
repeating inserting one or more additional dishes loaded with food to further available dish holders in a manner similar to the first dish until the dish caddy is fully loaded with dishes and food;
lifting the dish caddy by the user utilizing the hand grip after the dish caddy is fully loaded with dishes and food; and
carrying, by the user, the dish caddy fully loaded with dishes and food to the restaurant table from the back side of the dish caddy with the supporting rod held adjacent the user's body.

\* \* \* \* \*